US009632578B2

(12) United States Patent
Bae et al.

(10) Patent No.: US 9,632,578 B2
(45) Date of Patent: Apr. 25, 2017

(54) METHOD AND DEVICE FOR SWITCHING TASKS

(71) Applicant: SAMSUNG ELECTRONICS CO., LTD., Suwon-si (KR)

(72) Inventors: Joo-yoon Bae, Seoul (KR); Nam-wook Kang, Seoul (KR); Keum-koo Lee, Yongin-si (KR); Hye-won Lee, Anyang-si (KR); Yong-gook Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 52 days.

(21) Appl. No.: 14/225,996

(22) Filed: Mar. 26, 2014

(65) Prior Publication Data

US 2014/0292649 A1 Oct. 2, 2014

Related U.S. Application Data

(60) Provisional application No. 61/805,632, filed on Mar. 27, 2013.

(30) Foreign Application Priority Data

Jul. 29, 2013 (KR) .................. 10-2013-0089825

(51) Int. Cl.
*G06F 3/01* (2006.01)
*G06F 3/0488* (2013.01)
(Continued)

(52) U.S. Cl.
CPC ............. *G06F 3/01* (2013.01); *G06F 3/0488* (2013.01); *G06F 21/32* (2013.01);
(Continued)

(58) Field of Classification Search
CPC ..................................................... G06F 3/048
See application file for complete search history.

(56) References Cited

U.S. PATENT DOCUMENTS 5,666,502 A 9/1997 Capps
6,008,809 A 12/1999 Brooks
(Continued)

FOREIGN PATENT DOCUMENTS

EP 2 112 583 A1 10/2009
EP 2230623 A1 9/2010
(Continued)

OTHER PUBLICATIONS

Communication dated Sep. 25, 2014, issued by the European Patent Office in counterpart European Application No. 14161980.9.
(Continued)

*Primary Examiner* — Chad Dicke
(74) *Attorney, Agent, or Firm* — Sughrue Mion, PLLC

(57) ABSTRACT

Provided are a task switching method capable of rapidly and easily accessing a task of interest by using a button that may receive a touch-based input and a device for executing the task switching method. The device includes a button configured to receive an input; a display configured to display task switching screens; and a processor configured to set a task switching mode in response to the button receiving a first input, and control the display to display the task switching screens in response to the button receiving a second input.

35 Claims, 15 Drawing Sheets

(51) Int. Cl.
*G06F 21/32* (2013.01)
*H04W 12/08* (2009.01)
*H04M 1/725* (2006.01)
*H04L 29/06* (2006.01)
*H04W 88/02* (2009.01)
*H04M 1/67* (2006.01)

(52) U.S. Cl.
CPC ....... *H04M 1/72522* (2013.01); *H04W 12/08* (2013.01); *G06F 2203/0338* (2013.01); *G06F 2221/2113* (2013.01); *H04L 63/0861* (2013.01); *H04M 1/67* (2013.01); *H04W 88/02* (2013.01)

(56) References Cited

U.S. PATENT DOCUMENTS

| | | | |
|---|---|---|---|
| 6,397,337 | B1 | 5/2002 | Garrett et al. |
| 7,512,400 | B2 | 3/2009 | Starbuck et al. |
| 7,657,849 | B2 | 2/2010 | Chaudhri et al. |
| 8,046,721 | B2 | 10/2011 | Chaudhri et al. |
| 8,351,897 | B2 | 1/2013 | Shin et al. |
| 8,411,046 | B2 | 4/2013 | Kruzeniski et al. |
| 2005/0149879 | A1 | 7/2005 | Jobs et al. |
| 2005/0243979 | A1 | 11/2005 | Starbuck et al. |
| 2006/0167861 | A1 | 7/2006 | Arrouye et al. |
| 2006/0229097 | A1 | 10/2006 | Flynt et al. |
| 2007/0099642 | A1 | 5/2007 | Jin et al. |
| 2007/0150842 | A1 | 6/2007 | Chaudhri et al. |
| 2008/0020803 | A1 | 1/2008 | Rios et al. |
| 2008/0052717 | A1 | 2/2008 | Lee |
| 2008/0166993 | A1 | 7/2008 | Gautier et al. |
| 2008/0168368 | A1 | 7/2008 | Louch et al. |
| 2008/0320033 | A1 | 12/2008 | Koistinen et al. |
| 2009/0013275 | A1 | 1/2009 | May et al. |
| 2009/0013282 | A1 | 1/2009 | Mercer |
| 2009/0019120 | A1 | 1/2009 | Muguda |
| 2009/0083847 | A1 | 3/2009 | Fadell et al. |
| 2009/0094339 | A1 | 4/2009 | Allen et al. |
| 2009/0240647 | A1 | 9/2009 | Green et al. |
| 2009/0241072 | A1 | 9/2009 | Chaudhri et al. |
| 2010/0023892 | A1 | 1/2010 | Rakesh et al. |
| 2010/0058238 | A1* | 3/2010 | Ben Moshe ............ G06F 3/048 715/818 |
| 2010/0070898 | A1 | 3/2010 | Langlois |
| 2010/0088634 | A1 | 4/2010 | Tsuruta et al. |
| 2010/0146451 | A1 | 6/2010 | Jun-Dong et al. |
| 2010/0211872 | A1 | 8/2010 | Rolston et al. |
| 2010/0229115 | A1 | 9/2010 | Augustine et al. |
| 2010/0269040 | A1 | 10/2010 | Lee |
| 2010/0299597 | A1* | 11/2010 | Shin ...................... G06F 3/0482 715/702 |
| 2010/0306705 | A1 | 12/2010 | Nilsson |
| 2010/0313125 | A1* | 12/2010 | Fleizach ............. G06F 3/04883 715/702 |
| 2010/0313156 | A1 | 12/2010 | Louch et al. |
| 2011/0047134 | A1 | 2/2011 | Zhang et al. |
| 2011/0093812 | A1 | 4/2011 | Fong |
| 2011/0126156 | A1 | 5/2011 | Krishnaraj et al. |
| 2011/0154290 | A1 | 6/2011 | Kelly |
| 2011/0167387 | A1 | 7/2011 | Stallings et al. |
| 2011/0175930 | A1 | 7/2011 | Hwang et al. |
| 2011/0202872 | A1 | 8/2011 | Park |
| 2011/0258581 | A1 | 10/2011 | Hu |
| 2011/0300831 | A1 | 12/2011 | Chin |
| 2011/0316884 | A1 | 12/2011 | Giambalvo et al. |
| 2012/0005569 | A1 | 1/2012 | Roh |
| 2012/0005577 | A1 | 1/2012 | Chakra et al. |
| 2012/0023573 | A1 | 1/2012 | Shi |
| 2012/0084734 | A1 | 4/2012 | Wilairat |
| 2012/0117599 | A1 | 5/2012 | Jin et al. |
| 2012/0129496 | A1 | 5/2012 | Park et al. |
| 2012/0131471 | A1 | 5/2012 | Terlouw et al. |
| 2012/0164971 | A1 | 6/2012 | Choi et al. |
| 2012/0174042 | A1 | 7/2012 | Chang |
| 2012/0179969 | A1 | 7/2012 | Lee et al. |
| 2012/0210253 | A1 | 8/2012 | Luna et al. |
| 2012/0210266 | A1* | 8/2012 | Jiang ..................... H04N 21/233 715/772 |
| 2012/0256863 | A1 | 10/2012 | Zhang et al. |
| 2012/0272338 | A1 | 10/2012 | Falkenburg et al. |
| 2012/0289287 | A1 | 11/2012 | Kokubo |
| 2012/0290972 | A1 | 11/2012 | Yook et al. |
| 2012/0297298 | A1 | 11/2012 | Dovey et al. |
| 2012/0297304 | A1 | 11/2012 | Maxwell |
| 2012/0309433 | A1 | 12/2012 | Jeong et al. |
| 2012/0324357 | A1 | 12/2012 | Viegers et al. |
| 2013/0002725 | A1* | 1/2013 | Kim ..................... G06F 9/4445 345/684 |
| 2013/0042191 | A1 | 2/2013 | Kim et al. |
| 2013/0047119 | A1 | 2/2013 | Lee |
| 2013/0052993 | A1 | 2/2013 | Kwon et al. |
| 2013/0053105 | A1 | 2/2013 | Lee et al. |
| 2013/0054548 | A1 | 2/2013 | Fosback et al. |
| 2013/0063452 | A1 | 3/2013 | Ali et al. |
| 2013/0063479 | A1 | 3/2013 | Butlin et al. |
| 2013/0067376 | A1 | 3/2013 | Kim et al. |
| 2013/0083210 | A1 | 4/2013 | Beckham et al. |
| 2013/0091468 | A1 | 4/2013 | Xie |
| 2013/0232256 | A1 | 9/2013 | Lee et al. |
| 2014/0040812 | A1 | 2/2014 | Kurtz et al. |
| 2014/0068518 | A1* | 3/2014 | Liu ....................... G06F 9/4443 715/835 |
| 2014/0270082 | A1* | 9/2014 | Moellmer ................ A61B 6/14 378/98 |
| 2014/0283128 | A1* | 9/2014 | Shepherd ............. G06F 3/0482 726/28 |
| 2015/0135108 | A1* | 5/2015 | Pope .................. G06K 9/00006 715/767 |

FOREIGN PATENT DOCUMENTS

| | | |
|---|---|---|
| EP | 2 533 140 A1 | 12/2012 |
| EP | 2 551 762 A1 | 1/2013 |
| FR | 2971069 A | 8/2012 |
| JP | 3135104 B2 | 2/2001 |
| JP | 2004-191642 A | 7/2004 |
| JP | 2012-181847 A | 9/2012 |
| KR | 10-0683483 B1 | 2/2007 |
| KR | 10-2007-0115622 A | 12/2007 |
| KR | 10-2007-0120368 A | 12/2007 |
| KR | 10-2010-0027689 A | 3/2010 |
| KR | 10-2010-0114779 A | 10/2010 |
| KR | 10-2010-0134234 A | 12/2010 |
| KR | 10-2011-0011226 A | 2/2011 |
| KR | 10-2011-0026811 A | 3/2011 |
| KR | 10-2012-0006805 A | 1/2012 |
| KR | 10-2012-0054837 A | 5/2012 |
| KR | 10-2012-0126161 A | 11/2012 |
| KR | 10-2012-0131906 A | 12/2012 |
| KR | 10-2013-0024074 A | 3/2013 |
| KR | 10-2013-0024346 A | 3/2013 |
| RU | 2347258 C2 | 2/2009 |
| RU | 2363039 C2 | 7/2009 |
| WO | 2010/110613 A1 | 9/2010 |
| WO | 2010/144331 A2 | 12/2010 |
| WO | 2012032180 A1 | 3/2012 |
| WO | 2013/022849 A1 | 2/2013 |

OTHER PUBLICATIONS

Communication dated Oct. 9, 2014, issued by the European Patent Office in counterpart European Application No. 14161998.1.
Communication dated Oct. 10, 2014, issued by the European Patent Office in counterpart European Application No. 14161616.9.
Communication dated Nov. 5, 2014, issued by the European Patent Office in counterpart European Application No. 14161672.2.
Communication dated Nov. 6, 2014, issued by the European Patent Office in counterpart European Application No. 14161739.9.
"Private Desktop, Product Information", Tropical Software Website, Jul. 1, 2012, 2 pages total, XP055142907.

(56) References Cited

OTHER PUBLICATIONS

"Private Desktop, Screen Shots", Tropical Software Website, Jul. 1, 2012, 5 pages total, XP 055142903.
J R Raphael, "Android Power Tip : Put Your Dialer on Your Home Screen (or Lock Screen)", Jan. 15, 2013, 6 pages total, XP 55143362.
Communication dated Aug. 28, 2014 issued by the European Patent Office in counterpart European Patent Application No. 14161672.2.
Communication dated Jun. 26, 2014 issued by the International Searching Authority in counterpart International Patent Application No. PCT/KR2014/002472.
Alexandra Chang; "Up Close with iOS 5: New Gestures"; Macworld; Oct. 14, 2011; 4 total pages; XP055135715.
"Overview of webOS—User Interface"; HP webOS Developer Center; Jan. 13, 2012; 4 total pages; XP055135739.
"HP/Palm WebOS—Multi-tasking Made Easy, Featuring the Palm Pre Plus"; Mar. 19, 2010; 1 total page; XP054975489.
Communication dated Jul. 3, 2014 issued by the International Searching Authority in counterpart International Patent Application No. PCT/KR2014/002481.
Communication dated Jul. 2, 2014 issued by the International Searching Authority in counterpart International Patent Application No. PCT/KR2014/002464.
Communication dated Jul. 2, 2014 issued by the International Searching Authority in counterpart International Patent Application No. PCT/KR2014/002444.
Communication dated Jul. 2, 2014 issued by the International Searching Authority in counterpart International Patent Application No. PCT/KR2014/002443.
Communication dated Aug. 26, 2014 issued by the European Patent Office in counterpart European Patent Application No. 14161621.9.
Communication dated Jul. 3, 2014 issued by the International Searching Authority in counterpart International Patent Application No. PCT/KR2014/002489.
Communication dated Jul. 2, 2014 issued by the International Searching Authority in counterpart International Patent Application No. PCT/KR2014/002462.
Communication dated Oct. 6, 2016, issued by the Russian Patent Office in counterpart Russian Application No. 2015145945.
Communication dated Oct. 6, 2016, issued by the European Patent Office in counterpart European Application No. 14161980.9.
Gina Trapani: "Seven Easy Ways to Integrate Your Google Apps", Sep. 9, 2009, XP055305805, (6 pages total).
Communication dated Feb. 8, 2017, issued by the Federal Service for Intellectual Property in counterpart Russian Patent Application No. 2015145969 English translation.
Communication dated Feb. 21, 2017, issued by the European Patent Office in counterpart European Patent Application No. 14161998.1.

* cited by examiner

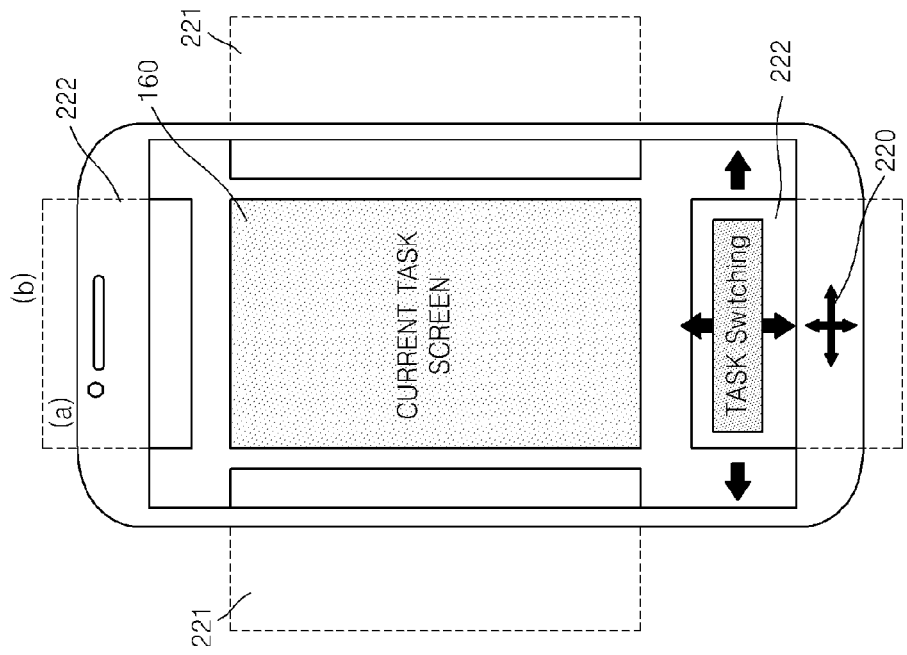
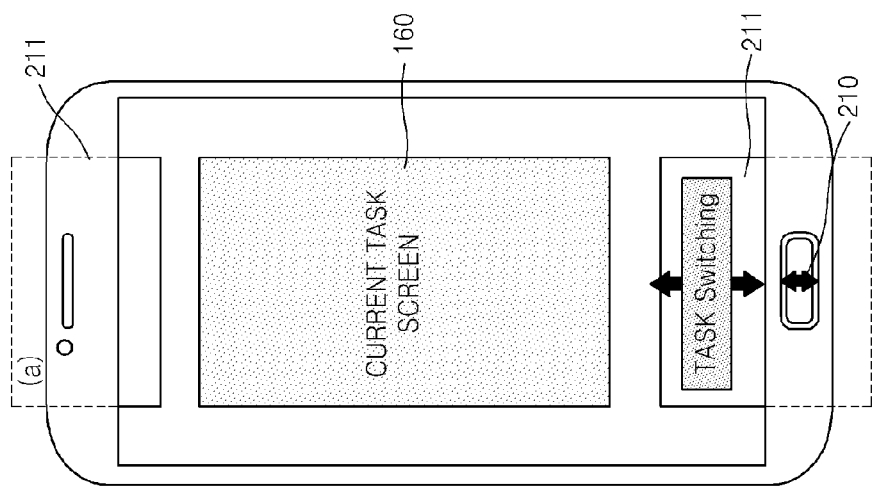

METHOD AND DEVICE FOR SWITCHING TASKS

CROSS REFERENCE TO RELATED APPLICATIONS

This application claims priority from Korean Patent Application No. 10-2013-0089825, filed on Jul. 29, 2013 in the Korean Intellectual Property Office, and U.S. Provisional Application No. 61/805,632, filed on Mar. 27, 2013 in the US Patent and Trademark Office, the disclosures of which are incorporated herein by reference in their entirety.

BACKGROUND

1. Field

Apparatuses and methods consistent with exemplary embodiments relate to providing a method and device for switching tasks.

2. Description of the Related Art

The development of devices such as smartphones has accelerated. Accordingly, tasks that may be executed by the devices are also increasing.

Tasks may be based on modulated information or a service item in a device. The modulated information or the service item may be established based on functions that may be performed by the device. The functions that may be performed by the device may include functions supported by applications. Therefore, the tasks may be executed based on the functions supported by the applications provided in the device; however, they are not limited thereto.

As the number of tasks that may be executed by a device increase, it may become difficult for a user to access a task of interest. Accordingly, there is a need for a method that allows a user to rapidly and easily access a task of interest.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

One or more exemplary embodiments provide a method and a device for switching tasks, which are capable of rapidly accessing a task of interest by using a button that may receive a touch-based input.

One or more exemplary embodiments also provide a method and a device for switching tasks, which are capable of accessing a task of interest by using a button that may receive fingerprint data and a touch-based input.

According to an aspect of an exemplary embodiment, there is provided a device including: a button configured to receive an input; a display configured to display task switching screens; and a processor configured to set a task switching mode in response to the button receiving a first input, and control the display to display the task switching screens in response to the button receiving a second input.

The processor may be configured to set the task switching mode by: capturing a screen of a task that is currently being executed; and arranging at least one task screen that is to be provided in response to the second input being received, based on the captured task screen.

The processor may be configured to set the task switching mode by controlling the display to display information representing the second input and information about the at least one task screen that is to be provided in response to the second input being received.

The button may include a home button of the device.

The button may be located in a region of the device other than a region of the device where the display is disposed.

The display may include a touch screen, and the button is located in a region of the device other than a region of the device where the touch screen is disposed.

The task switching screens may include at least one of a switching screen to switch between tasks that are being executed by the device, a switching screen to switch between tasks based on usage history information of the device, a switching screen to switch between folders set in the device, and a switching screen to switch between tasks registered in the device in advance, wherein each of the tasks may be based on an application, and wherein the processor may be configured to determine tasks that are to be switched in response to the second input being received.

The processor may be configured to, if no touch input is received via the button while the task switching screens are displayed on the display, execute a task mapped with a task screen centered on the display.

The button may be configured to receive fingerprint data, and wherein the processor is configured to control the display to display the task switching screens in response to the button receiving fingerprint data corresponding to fingerprint data that is registered in advance.

The button may be configured to receive fingerprint data, and wherein the processor may be configured to control the display to display the task switching screens in response to the button receiving fingerprint data corresponding to fingerprint data registered in advance, and execute a guest mode of the device in response to the received fingerprint data not corresponding to the fingerprint data registered in advance.

The button may be configured to receive fingerprint data, and wherein the processor may be configured to control the display to display a task switching screen mapped with the fingerprint data in response to the button receiving fingerprint data corresponding to a piece of fingerprint data from among fingerprint data registered in advance, and execute a guest mode of the device in response to the received fingerprint data not corresponding to a piece of fingerprint data from among the fingerprint data registered in advance.

The button may be configured to receive fingerprint data, and wherein the processor may be configured to ignore a subsequent touch input received by the button in response to the received fingerprint data not corresponding to fingerprint data registered in advance.

The first input may include a touch input to maintain a touch operation for at least a preset time, and wherein the second input may include a gesture-based touch input representing a moving direction of the touch input.

The processor may be configured to control the display to display task switching screens that vary based on the moving direction represented by the second input.

According to an aspect of an exemplary embodiment, there is provided a device including: a button configured to receive fingerprint data and an input; a display configured to display task switching screens; and a processor configured to, while an operation status of the device is a lock screen status, set a task switching mode in response to the button receiving a first input and the button receiving fingerprint data corresponding to fingerprint data registered in advance, control the display to display the task switching screens in response to the button receiving a second input, and execute a preset guest mode of the device in response to the button receiving fingerprint data that does not correspond to the fingerprint data registered in advance.

According to an aspect of an exemplary embodiment, there is provided a task switching method including: receiving, during execution of a task, a first input by a button mounted on a device; setting, in response to the first input being received, an operation mode of the device as a task switching mode; receiving a second input by the button; and displaying, on a display of the device, task switching screens in response to the second input being received.

The setting the task switching mode may include: capturing a screen of a task that is currently being executed; and arranging at least one task screen that is to be provided in response to the second input being received, based on the captured task screen.

The setting of the task switching mode may further include displaying information representing the second input and information about the at least one task screen that is to be provided in response to the second input being received.

The button may include a home button of the device.

The button may be located in a region of the device other than a region of the device where the display is disposed.

The display may be configured as a touch screen, and the button is located in a region of the device other than a region of the device where the touch screen is disposed.

The task switching method may further include executing, while the task switching screens are displayed on the display, a task mapped with a task screen centered on the display if no touch-based input is received by the button.

The task switching screens may include at least one of a switching screen to switch between tasks that are being executed by the device, a switching screen to switch between tasks based on usage history information of the device, a switching screen to switch between folders set in the device, and a switching screen to switch between tasks registered in the device in advance, wherein each of the tasks may be based on an application, and wherein the displaying of the task switching screens may include determining tasks that are to be switched in response to the second input being received.

The task switching method may further include: receiving fingerprint data by the button; and executing the task switching method in response to the received fingerprint data corresponding to fingerprint data registered in advance.

The task switching method may further include: receiving fingerprint data by the button; executing the task switching method in response to the received fingerprint data corresponding to fingerprint data registered in advance; and executing a guest mode of the device in response to the received fingerprint data not corresponding to the fingerprint data registered in advance.

The task switching method may further include: receiving fingerprint data by the button; executing the task switching method so as to display a task switching screen mapped with the fingerprint data in response to the received fingerprint data corresponding to a piece of fingerprint data registered in advance; and executing a guest mode of the device in response to the received fingerprint data not corresponding to a piece of the fingerprint data registered in advance.

The first input may be a touch input which maintains a touch operation for at least a preset time, and wherein the second input is a gesture-based touch input representing a moving direction of the touch input.

The displaying of the task switching screens may include displaying task switching screens that vary based on a moving direction represented by the second input.

According to an aspect of an exemplary embodiment, there is provided a non-transitory computer-readable recording medium having embodied thereon a program for executing the task switching method.

According to an aspect of an exemplary embodiment, there is provided a task switching method executed by a device, the task switching method including: receiving fingerprint data via a button mounted on the device while an operation status of the device is a lock screen status; unlocking the lock screen status in response to the received fingerprint data corresponding to fingerprint data registered in advance; receiving a first input via the button; setting a task switching mode in response to the first input being received; receiving a second input via the button; displaying task switching screens on a display of the device in response to the second input being received; and maintaining the lock screen status in response to the received fingerprint data not corresponding to the fingerprint data registered in advance.

According to an aspect of an exemplary embodiment, there is provided a task switching method executed by a device, the task switching method including: receiving fingerprint data via a button mounted on the device while an operation status of the device is a lock screen status; unlocking the lock screen status in response to the received fingerprint data corresponding to fingerprint data registered in advance; receiving a first input via the button; setting a task switching mode in response to the first input being received; receiving a second input via the button; displaying task switching screens on a display of the device in response to the second input being received; and unlocking the lock screen status and executing a guest mode of the device in response to the received fingerprint data received not corresponding to the fingerprint data registered in advance.

According to an aspect of an exemplary embodiment, there is provided a device including: an input unit configured to receive a user input; a display configured to display task switching screens; and a controller configured to control the device to enter a task switching mode in response to a first user input being received by the input, and control the display to display the task switching screens in response to a second user input being received by the input while the device is the task switching mode.

In response to the device entering the task switching mode, the controller may be further configured to capture a screen of a currently executed task and arrange the task switching screens based on the currently executed task.

In response to the device entering the task switching mode, the controller may be further configured to display message information, wherein the message information includes at least one from among a current mode of the device and arrows indicating available scrolling directions of the task switching screens.

The controller may be further configured to arrange the task switching screens in response to user fingerprint data being received by the input.

The controller may be further configured to execute a task corresponding to a task screen of the task switching screens in response to the task screen being selected.

BRIEF DESCRIPTION OF THE DRAWINGS

The above and/or other aspects will become more apparent and more readily appreciated from the following description of certain exemplary embodiments, taken in conjunction with the accompanying drawings in which:

FIGS. 2A and 2B are diagrams showing examples of a button and a task screen provided according to the button, according to an exemplary embodiment;

DETAILED DESCRIPTION OF EXEMPLARY EMBODIMENTS

Figure 1:
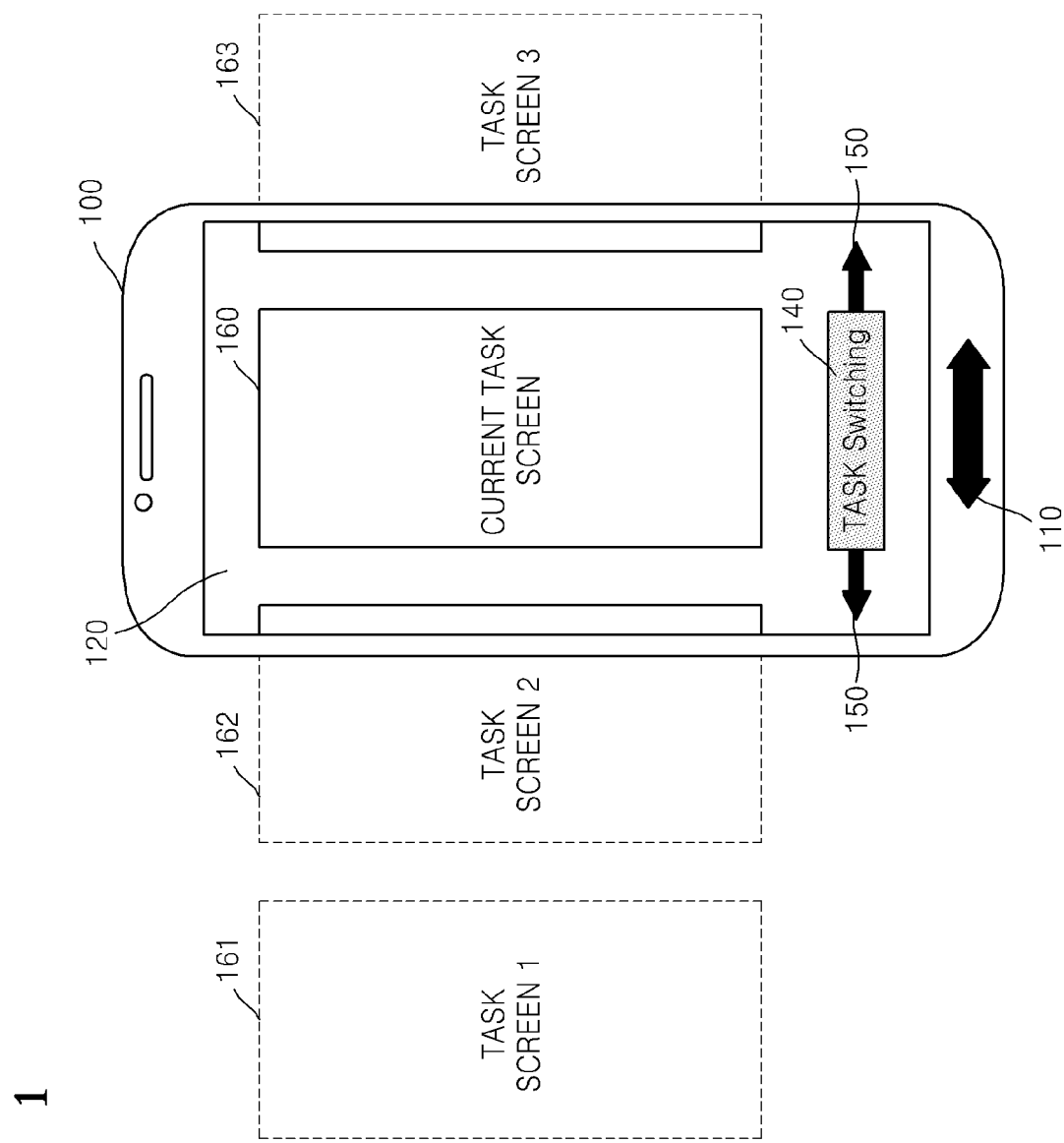
FIG. 1 illustrates a device according to an exemplary embodiment.

In the following specification, like reference numerals refer to the like elements throughout. In this regard, the exemplary embodiments may have different forms and should not be construed as being limited to the descriptions set forth herein. Accordingly, the exemplary embodiments are merely described below, by referring to the figures, to assist in a comprehensive understanding of the exemplary embodiments. As used herein, the term "and/or" includes any and all combinations of one or more of the associated listed items. Expressions such as "at least one of," when preceding a list of elements, modify the entire list of elements and do not modify the individual elements of the list. Also, well-known functions or constructions are not described in detail since they would obscure the exemplary embodiments with unnecessary detail.

Most of the terms used herein are general terms that are widely used in the technical art to which the exemplary embodiments pertain. However, some of the terms used herein may reflect intentions of technicians in this art, precedents, or the occurrence of new technologies. Also, some of the terms used herein may be arbitrarily chosen. In this case, these terms are defined in detail below. Accordingly, the specific terms used herein should be understood based on the unique meanings thereof and the whole context of the exemplary embodiments.

It will be understood that the terms "comprises" and/or "comprising" or "includes" and/or "including" when used in this specification, specify the presence of stated elements, but do not preclude the presence or addition of one or more other elements. Also, expressions such as " . . . unit" and "module" stated in the specification denote units that process at least one function or operation, and they may be implemented by hardware, software, or a combination of hardware and software.

Throughout the specification, "application" refers to a group or a series of computer programs designed to perform certain functions. In the present specification, the applications may be various types of applications. For example, the applications may include a telephone application, a message application, a social networking service (SNS) application, a game application, a video reproducing application, a map application, a memo application, a broadcasting application, an exercise support application, a payment application, a picture editing application, etc.; however, the applications are not limited thereto.

Throughout the specification, a "task" may be based on an application. For example, each of the telephone application, the message application, and the broadcasting application may be referred to as one task. Therefore, "task switching" may include, for example, switching between the telephone application and the message application, switching between the telephone application and the broadcasting application, or switching between the message application and the broadcasting application; however, the task switching is not limited thereto.

Throughout the specification, "task switching" may include switching between recently executed applications, switching between favorite applications, switching between applications of interest, switching between media applications, switching between communication applications, etc.

According to an exemplary embodiment, "task switching" may include switching between task screens of the tasks that may be selectable on a screen of a device. For example, if the tasks that may be selected are the telephone application, the message application, and the broadcasting application, the task switching may include switching between a task screen of the telephone application and a task screen of the message application, and switching between a task screen of the message application or a task screen of the broadcasting application; however, the task switching is not limited thereto.

According to an exemplary embodiment, the task switching may include switching from a task currently being executed by a device to another task. For example, if it is assumed that each of the telephone application, the message application, and the broadcasting application is a task, the task switching may include a task switching from the telephone application to the message application, a task switching from the message application to the broadcasting application, or a task switching from the broadcasting application to the telephone application; however, the task switching is not limited thereto.

Throughout the specification, the task may be based on modular information and/or a service item in a device. The modular information and/or service item may be based on functions which can be executed by the device.

The functions which can be executed by the device may be based on functions supported by the applications. For example, the telephone application may support a keypad function, a recent call function, favorites function (or bookmark function), and a telephone number list function that are supported by the telephone application.

Therefore, throughout the specification, the task switching may include, for example, switching between the keypad function and the recent call function, switching between the keypad function and the favorites function, switching between the keypad function and the telephone number list function, or switching between the recent call function and the favorites function; however, the task switching is not limited thereto.

Also, throughout the specification, the task switching may include, for example, switching between a task screen of the keypad function and a task screen of the recent call function, switching between the task screen of the keypad function and a task screen of the telephone number list function, etc.; however, the task switching is not limited thereto.

The functions that may be executed by the device may be based on a screen. For example, the functions of the device may be executed based on a screen such as a black screen, a lock screen, a widget screen, or an application screen. Therefore, the task switching may include, for example, switching between the black screen and the lock screen, switching between the black screen and the widget screen, or switching between the black screen and the application screen; however, the task switching is not limited thereto.

The black screen denotes that the device is in a standby mode. The standby mode of the device may include, for example, a status where operations, except for an operation based on a sensor included in the device, are not performed; however, the standby mode of the device is not limited thereto. The lock screen denotes a locked status of the device. The widget screen includes widgets. The application screen may include a screen including icons of applications or a screen provided according to execution of applications; however, the application screen is not limited thereto.

The functions that may be executed by the device may be based on a folder. For example, accessing a game folder, a movie folder, or a picture folder may be referred to as a function that may be executed by the device. Therefore, throughout the specification, the task switching may include switching between the game folder and the movie folder, switching between the game folder and the picture folder, or switching between the picture folder and the moving folder; however, the task switching is not limited thereto. The switching between the folders may be performed based on the task screen.

The functions that may be executed by the device may be based on categories. For example, the functions of the device may be performed based on categories such as SNS, communication, media, or games. Therefore, throughout the specification, the task switching may include, for example, switching between SNS and communication, switching between SNS and media, or switching between games and media; however, the task switching is not limited thereto.

Throughout the specification, the task may be based on a list of information received by the device. For example, each of a first list including information received today, a second list including all received information, and a third list including unidentified information from among received information may be referred to as one task. Therefore, the task switching in the specification may include, for example, switching between the first and second lists, switching between the second and third lists, or switching between the third and first lists; however, the task switching is not limited thereto.

The task may be based on a tab displayed on the device. The tab may include, for example, a name tab, a size tab, a kind tab, and a weather tab displayed when opening a picture folder. Therefore, throughout the specification, the task switching may include switching between the name tab and the size tab, switching between the kind tab and the weather tab, etc.; however, the task switching is not limited thereto.

In the specification, the task may be based on a menu item. Thus, the task switching may include switching between menu items; however, the task switching is not limited thereto.

In the specification, the task and the task switching are not limited to the above examples, but may differ. Throughout the specification, the task switching may include switching between task screens captured from related tasks.

Certain exemplary embodiment will now be described in greater detail with reference to the accompanying drawings.

FIG. 1 illustrates a diagram of a device 100 according to an exemplary embodiment.

A button 110 included in the device 100 may be a button that receives a touch input from a user. The device 100 may include a display 120. The display 120 of the device 100 may be a touch screen.

The touch input that may be received through the button 110 may include a first input that denotes maintaining a touch for a predetermined time and a second input based on a touch gesture representing a moving direction of the touch input; however, the touch input is not limited thereto. The second input may be a touch gesture, for example, like a swipe; however, the second input is not limited thereto.

The button 110 may be a home button. The button 110 may have a shape based on a moving direction of the touch-based input. For example, the button 110 shown in FIG. 1 has a shape based on a movement in left and right directions (i.e., a left right arrow).

FIGS. 2A and 2B illustrate examples of shapes of the button and task screens provided according to the shapes of the button, according to exemplary embodiments.

A button 210 shown in FIG. 2A may have a shape based on a combination of a shape based on movements in up-and-down directions and a shape of an existing home button. Based on the shape of the button 210 shown in FIG. 2A, task screens 211 to be switched may be placed on at least one of the up and down sides of a current task screen 160. The shape of the button 210 of FIG. 2A may be based on only the movements in the up-and-down directions. The button 110 of FIG. 1 may have a shape based on a combination of the shape indicating the moving direction with the existing home button shape like the button 210 of FIG. 2A.

A button 220 shown in FIG. 2B may have a shape based on movements in up and down direction and left and right directions. Based on the button 220 shown in FIG. 2B, task screens 221 and 222 to be switched may be placed on at least one from among the left, right, up, and down sides of the current task screen 160. The button 220 of FIG. 2B may also have a shape based on a combination of the shape indicating the moving direction with the existing home button shape, i.e., similar to the button 210 of FIG. 2A.

The task screens 221 may be switched when the second input representing the movement in the left and right directions is received. The task screens 222 may be switched when the second input representing the movement in the up-and-down directions is received. The switching may be continuously performed in a scrolling manner.

The button 110 of FIG. 1 may have a shape based on movements in east, south-east, south, south-west, west, north-west, north, and north-east directions.

The device 100 may perform a switching operation between different tasks according to the second input via the button 110. For example, when a second input representing the movement in the left and right directions is received via the button 110, the device 100 performs the task switching by using task screens of a plurality of tasks that are currently executed, and when a second input representing the movement in the up-and-down direction is received via the button 110, the device 100 may perform the task switching by using task screens of a plurality of tasks that have recently been executed.

The button 110 may be mounted on a region other than the display 120 (that is, a non-display region). The non-display region may include, for example, bezel regions of the device 100, a rear surface of the device 100, a peripheral region of the home button in the device 100, or the home button of the device 100; however, the non-display region is not limited thereto. In a case where the display 120 is a touch screen, the non-display region may be referred to as a non-touch screen region. According to one or more exemplary embodiment, the button 110 may be a physical button.

In a case where the touch input may be received via the button 110, the button 110 may be configured as a resistive layer type button, a capacitive type button, an infrared ray type button, and an ultrasound wave type button, etc.; however, the button 110 is not limited thereto.

A fingerprint data input and a touch input may be received via the button 110. In a case where the button 110 may receive the fingerprint data input and the touch input, the button 110 may be configured based on a fingerprint recognition sensor such as a thermal sensor, a capacitive sensor, an electric field sensor, and a semiconductor sensor; however, the button 110 is not limited thereto. If the button 110 is configured based on the fingerprint recognition sensor, the device 100 may have a function of analyzing a touch input based on fingerprint data received via the button 110.

The button 110 may receive a fingerprint data input, a touch input, and a click input. In a case where the fingerprint data input, the touch input, and the click input are received through the button 110, the button 110 may be configured based on the fingerprint recognition sensor and a part or all of a boundary of the button 110 may receive the click input. The click input may be used as the above-described touch-based second input. If the button 110 is configured to receive the click input via the boundary of the button 110, the boundary of the button 110 may be formed as a protrusion type boundary.

In a case where the button 110 may receive the fingerprint data input and the touch input, the task switching may operate in a host mode and a guest mode, respectively. The host mode is a mode in which all task switching operations that may be provided by the device 100 are used. The guest mode is a mode in which some of the task switching operations that may be provided by the device 100 may be used. A range of task switching operations provided in the guest mode may be set in advance in the device 100. In addition, the range of the task switching operations provided in the guest mode may be set in advance with respect to each user of the device 100.

When an operating mode of the device 100 is set as a task switching mode, the device 100 may display, on the display 120, a message 140 notifying a user that the task switching mode is set. The device 100 may display information 150 representing an acceptable second input on the display 120. The acceptable second input may be referred to as a receivable second input.

The information 150 representing the acceptable second input may be formed to be the same shape as the button 110. For example, if the button 110 is formed as a cross shape, as shown in FIG. 2B, the information 150 representing the acceptable second input may be displayed as a cross shape on the display 120. According to the exemplary embodiment, the message 140 notifying the setting as the task switching mode and the information 150 representing the acceptable second input may be independently displayed.

When setting the task switching mode, the device 100 captures a screen of the currently executed task as the current task screen 160, and may arrange at least one task screen, for example, a first task screen 161, a second task screen 162, and a third task screen 163, which are provided according to the acceptable second input to the device 100, based on the current task screen 160, as illustrated in FIG. 1 for example. The first through third task screens 161, 162, and 163 are screens about tasks which are different from each other.

The at least one task screen that is provided according to the second input may be stored in the device 100 in advance. The at least one task screen stored in the device 100 may be obtained by capturing a last screen of the task that is executed by the device 100. For example, when a task 1 is performed by the device 100, a screen of the task 1, which is captured right before switching to another task, may be stored as the first task screen 161. According to the exemplary embodiment, information about the task screens to be switched may be managed by a task management module 1375 shown in FIG. 13 that will be described later.

Arrangement of the task screens to be switched according to the exemplary embodiment may be determined by the second input via the button 110. The task screens to be switched may be determined by at least one of a task that is currently executed by the device 100, usage history information of the device 100, and a current operating status of the device 100. The current operating status of the device 100 may include at least one of a lock screen status and a task execution status.

In a case where the button 110 may receive the fingerprint data input and the touch input, the device 100 may perform switching operations between different kinds of tasks according to the fingerprint data. To do this, information about fingerprint data of each finger of a user and the kinds of tasks corresponding to the fingerprint data may be stored in the device 100 in advance.

Figure 3:
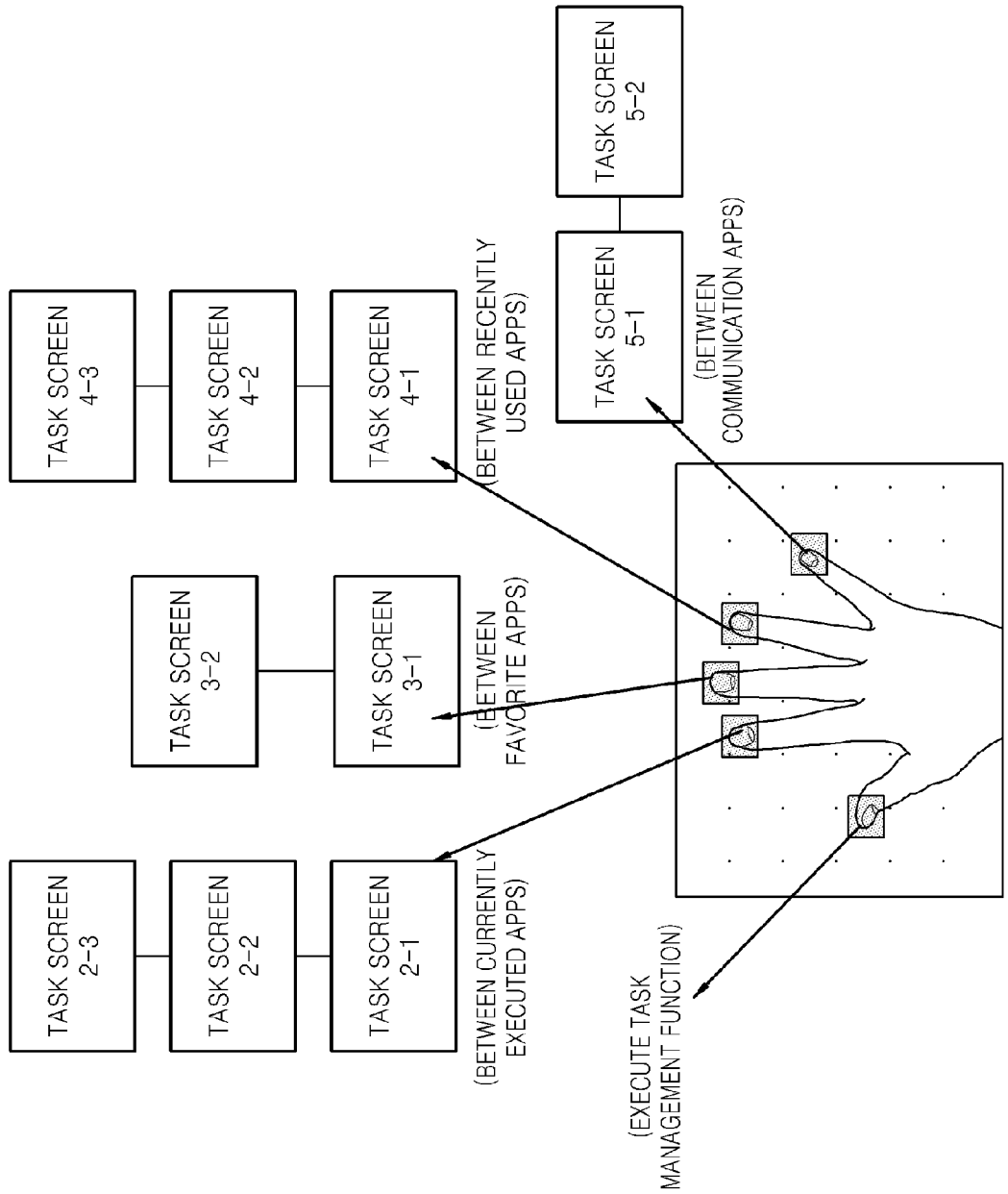
FIG. 3 is a diagram illustrating different kinds of tasks mapped to fingerprint data of each finger of the right hand of a user, according to an exemplary embodiment.

FIG. 3 is a diagram showing that different kinds of tasks mapped to the fingerprint data of each finger of the right hand of a user.

Referring to FIG. 3, when fingerprint data of a thumb is input through the button 110, the device 100 may execute a task management function. The task management function may include a function of selecting kinds of tasks to be mapped with each finger of the right hand of the user; however, the task management function is not limited thereto.

Referring to FIG. 3, applications that are currently executed by the device 100 are mapped with fingerprint data of an index finger of the user's right hand. Accordingly, the device 100 may perform switching between a task screen 2-1, a task screen 2-2, and a task screen 2-3, which are related to the currently executed application, by using the fingerprint data of the index finger of the user's right hand.

Referring to FIG. 3, applications that the user likes are mapped to fingerprint data of a middle finger of the user's right hand. Accordingly, the device 100 may perform switching between a task screen 3-1 and a task screen 3-2 that are related to the applications that the user likes by using the fingerprint data of the middle finger of the user's right hand.

Referring to FIG. 3, applications recently used by the device 100 are mapped with fingerprint data of a ring finger of the user's right hand. Accordingly, the device 100 may perform switching between a task screen 4-1, a task screen 4-2, and a task screen 4-3 that are related to the recently used applications by using the fingerprint data of the ring finger of the user's right hand.

Referring to FIG. 3, communication applications are mapped with fingerprint data of the pinky finger of the user's right hand. Accordingly, the device 100 may perform switching between a task screen 5-1 and a task screen 5-2 about the communication applications by using the fingerprint data of the little finger of the user's right hand.

The switching tasks mapped with the fingerprint data are not limited to the examples shown in FIG. 3. For example, the fingerprint data of the fingers may include all fingers of a left hand, some fingers of the left hand, some fingers of the right hand, some fingers of the left hand and some fingers of the right hand, all fingers of the right hand and all fingers of the left hand, all fingers of the right hand and some fingers of the left hand, or some fingers of the right hand and all fingers of the left hand.

In a case where the button 110 receives the fingerprint data input and the touch input, the tasks to be switched, which are performed by the device 100, may be set according to the fingerprint data of each of the user's fingers and the second input.

The device 100 may include various sensors in the display 120 or adjacent to the display 120 in order to recognize a touch input of the user. Examples of the sensors for sensing the touch input may include a tactile sensor and a proximity sensor, but are not limited thereto. Examples of the proximity sensor may include a transparent photoelectric sensor, a direct reflective photoelectric sensor, a mirror reflective photoelectric sensor, a high frequency oscillation photoelectric sensor, a capacitive photoelectric sensor, a magnetic photoelectric sensor, an infrared photoelectric sensor, etc., but are not limited thereto.

The device 100 may release a lock screen status according to the fingerprint data received through the button 110 when the device 100 in a lock screen status, and then, executes the task switching operation.

The device 100 according to the exemplary embodiment may be variously realized. For example, the device 100 may be at least one of a mobile phone, a smartphone, a laptop computer, a tablet PC, an electronic book terminal, a digital broadcasting terminal, a personal digital assistant (PDA), a portable multimedia player (PMP), a navigation system, an MP3 player, etc., but is not limited thereto. For example, the device 100 may be a wearable device such as a watch, glasses, etc., but the wearable device is not limited thereto.

Figure 4:
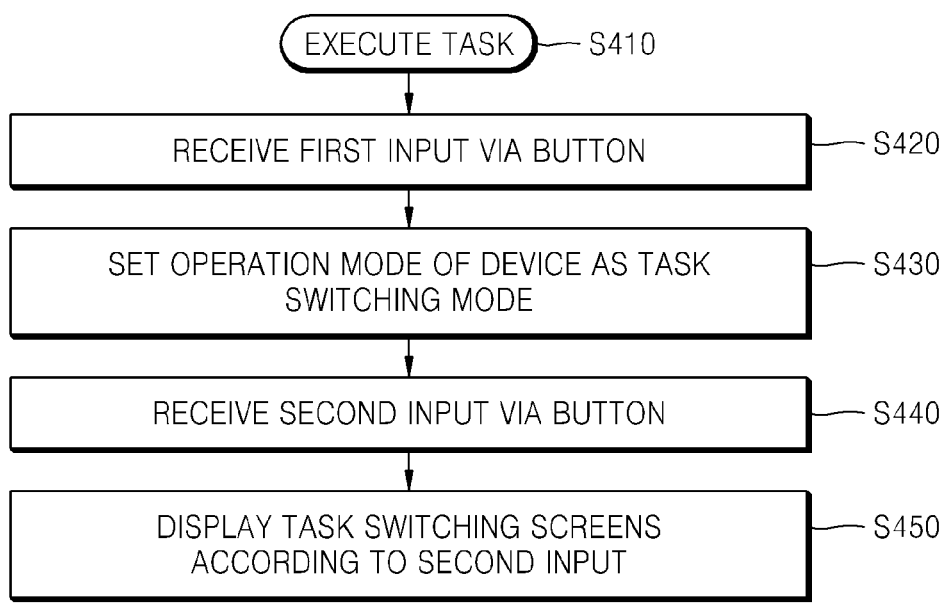
FIG. 4 is a flowchart of a method of switching tasks, the method performed by the device, according to an exemplary embodiment.

FIG. 4 is a flowchart of a task switching method performed by the device 100, according to an exemplary embodiment.

During execution of a task by the device 100, in operation S410, the device 100 receives a first input via the button 110, in operation S420. For example, the first input may include a touch-based input where the user touches the button 110 by using a touch tool (for example, a finger or an electronic pen) for at least a preset time (i.e., the touch operation on the button 110 is maintains for at least a preset time). The first input may be referred to as a touch-based input combining a touch operation on the button 110 and an operation of maintaining the touch operation on the button 110 for a preset time.

A touch region (or a touch point) relating to the first input may be an entire region or a partial region of the button 110. In operation S420, when the first input is received via the button 110, the device 100 set an operation mode as a task switching mode, in operation S430. A process of setting the operation mode of the device 100 as the task switching mode may include a process of capturing a screen of a currently executed task as a current task screen, and a process of arranging task screens to be switched based on the captured task screen. However, the process of setting the operation mode of the device as the task switching mode is not limited thereto.

The process of setting the operation mode of the device 100 as the task switching mode may further include a process of displaying at least a piece of information, for example, the message 140 and the information 150 shown in FIG. 1 on the display 120.

The process of setting the operation mode of the device 100 as the task switching mode may further include a process of displaying the captured current task screen on the display 120. The device 100 may capture the current task screen having a size that is less than an original screen size. Therefore, the device 100 may display the current task screen having the size that is less than the original screen size on the display 120 as the current task screen 160 shown in FIG. 1. Further, as shown in FIG. 1, the current task screen 160 may be centered on the display 120.

The current task screen may have a size that is equal to that of the original screen size. In a case where the current task screen has the size equal to that of the original screen size, the current task screen may be displayed in black-and-white or a boundary of the current task screen may be highlighted in order to show that the screen displayed on the display 120 is the captured current task screen; however, methods to show that the screen displayed on the display 120 is the captured current task screen are not limited thereto.

Figure 5:
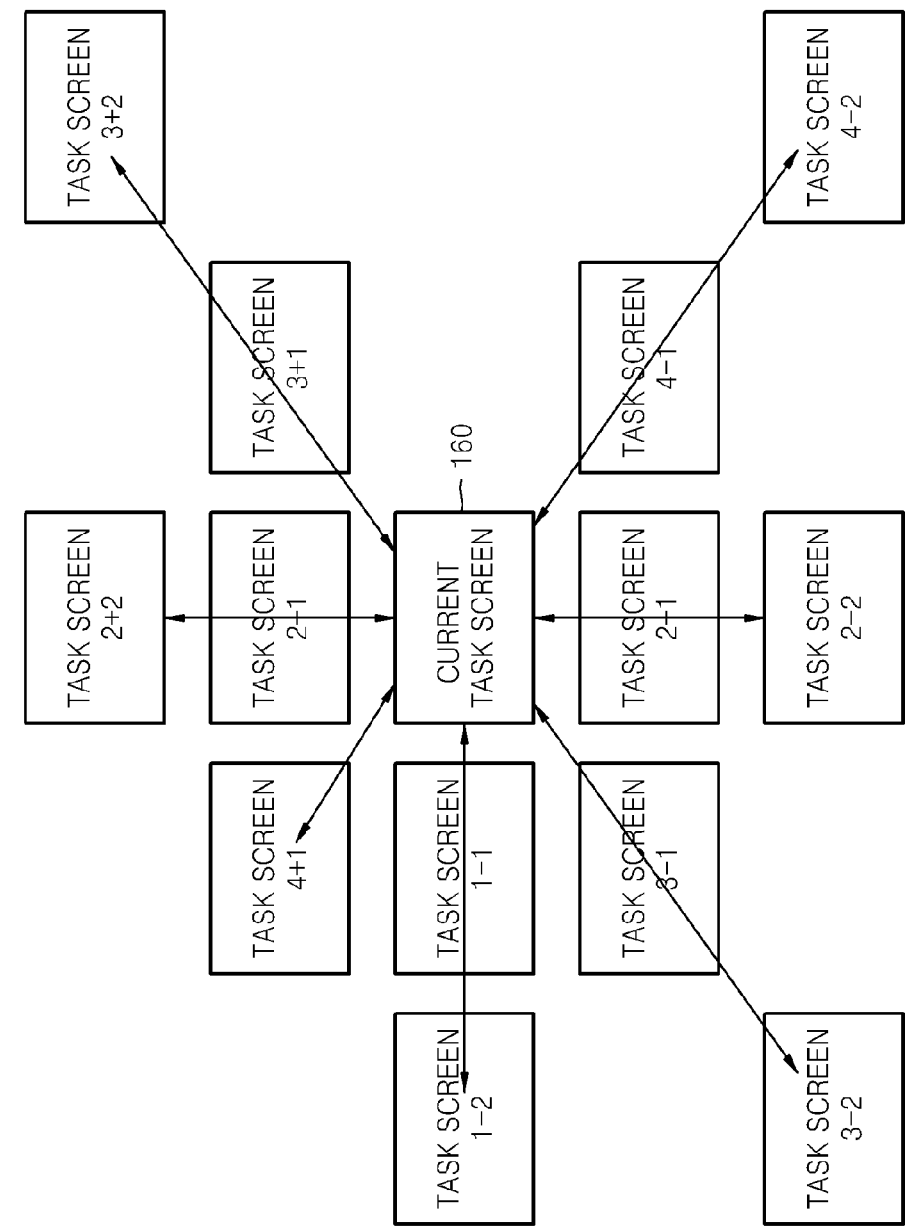
FIG. 5 is a diagram showing an example of arranging task screens to be switched according to a second input that may be received, according to an exemplary embodiment.

The arrangement of the task screens that are to be switched based on the captured task screen may be determined according to the second input. FIG. 5 is a diagram showing an example of arranging the task screens to be switched according to the second input. FIG. 5 shows examples of the second input via the button 110 including a left-and-right direction input, an up-and-down direction input, a north-east and south-west direction input, and a south-east and north-west direction input.

Referring to FIG. 5, a task screen 1-1 and a task screen 1-2 in the left-and-right direction may be task screens that are arranged based on usage history information of the device 100. For example, the task screen 1-1 is a screen of a task that is used before the current task screen 160, and the task screen 1-2 may be a screen of a task used before the task screen 1-1. However, the arrangement of the task screen 1-1 and the task screen 1-2 is not limited to the arrangement based on the usage history information of the device 100.

In FIG. 5, a task screen 2+2, a task screen 2+1, a task screen 2-1, and a task screen 2-2 in the up-and-down direction may be task screens arranged based on a task that is currently executed by the device 100. For example, the task screen 2+2, the task screen 2+1, the task screen 2-1, and the task screen 2-2 are screens obtained by capturing multi-tasks that are currently executed with the task corresponding to the current task screen 160.

A task screen 3+2, a task screen 3+1, a task screen 3-1, and a task screen 3-2 in the north-east and south-west direction shown in FIG. 5 may be task screens that are arranged based on categories set in the device 100.

A task screen 4+1, a task screen 4-1, and a task screen 4-2 in the south-east and north-west direction shown in FIG. 5 may be task screens arranged based on folders formed in the device 100.

However, the tasks that are to be switched according to the second input via the button 110 are not limited to the examples of FIG. 5.

In operation S440, the device 100 receives a second input via the button 110. For example, the second input may include an input based on a touch gesture representing a moving direction based on the touch region from which the first input was received. The touch gesture representing the moving direction may be a touch gesture such as a swipe, but is not limited thereto.

The touch gesture may denote a moving direction through the touch gesture moving a preset distance from the touch region from which the first input was received. The touch gesture may denote the moving direction by using a touch gesture of tilting a finger at the touch region. For example, movement to a left direction may be represented by using a touch gesture of tilting a finger in a left direction (or pushing a left portion) at the touch region where the first input was received. Similarly, movement to a right direction may be represented by a touch gesture of tilting the finger to a right side (or pushing a right portion) at the touch region where the first input was received. The device 100 may be configured to determine the moving direction by sensing a variation in a touch surface of the button 110 according to the tilting of the finger.

When the second input is received, in operation S440, the device 100 may display a screen of switching the task screens according to the second input on the display 120, in operation S450. For example, when the second input representing the movement in the left direction is received through the button 110, the device 100 may display a screen of switching the task screens from a right side to a left side based on the currently executed task on the display 120.

FIGS. 6A through 6D are examples of a task switching performed by the device 100 according to an exemplary embodiment.

Figure 6A:
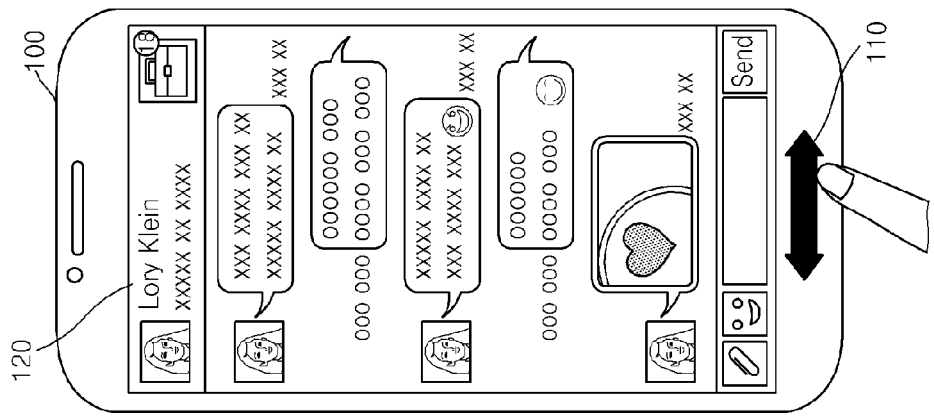
FIGS. 6A through 6D are diagrams showing methods of switching tasks, the method performed by the device, according to exemplary embodiments.
Figure 6B:
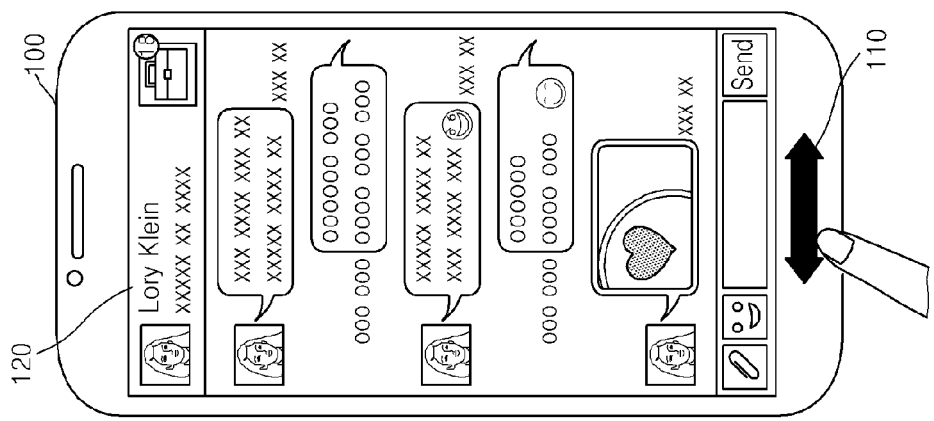

As shown in FIG. 6A, when a messenger service is executed by the device 100, the device 100 senses a touch input via the button 110. In addition, as shown in FIG. 6B, when it is sensed that the touch input via the button 110 is maintained for a preset time, the device 100 may recognize that a first input is received via the button 110.

Figure 6C:
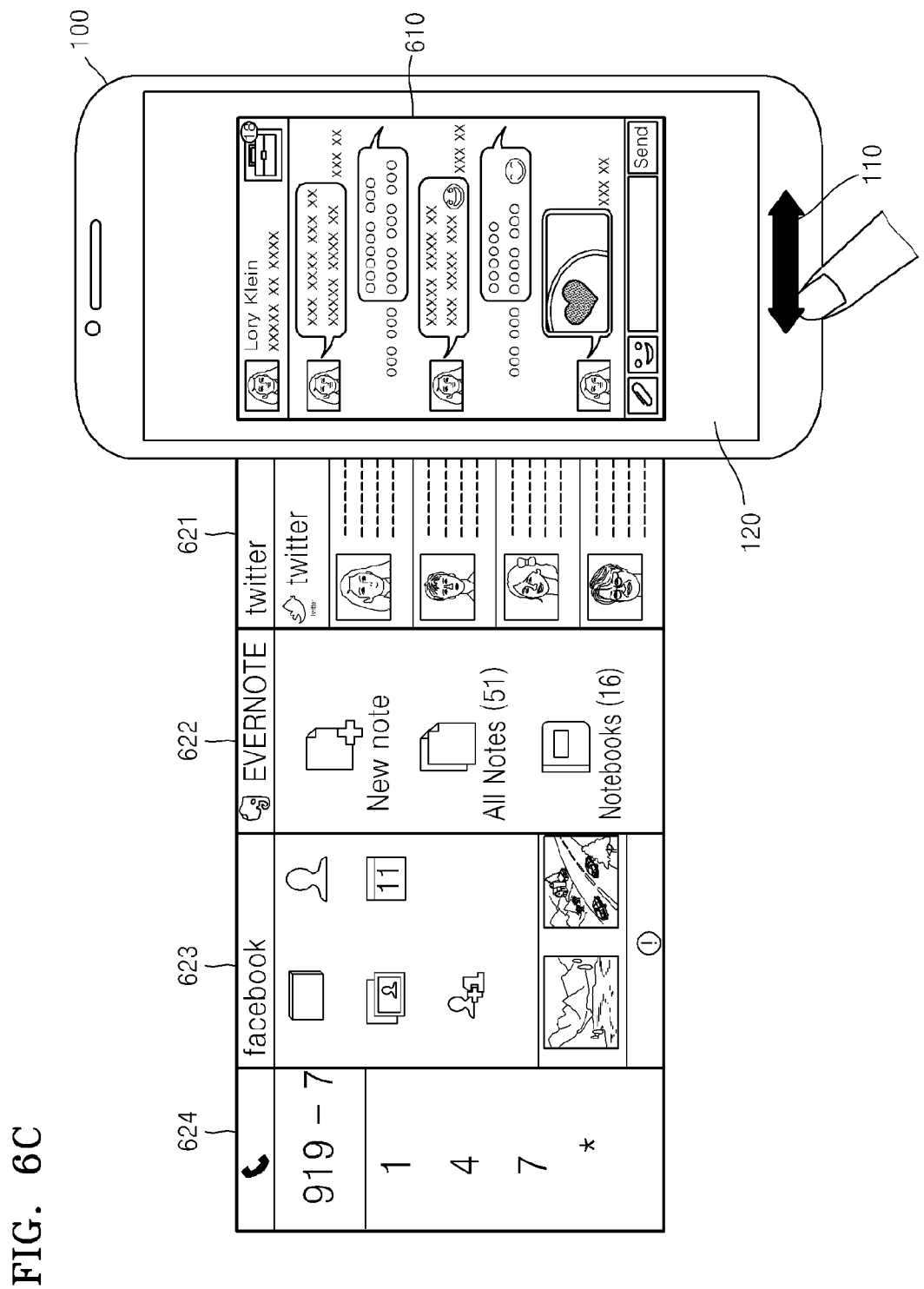

When it is sensed that the first input is received, the device 100 may set an operation mode as a task switching mode. Accordingly, the device 100 may arrange task screens 621 through 624 to be switched based on a captured current screen 610 and the second input that will be received as shown in FIG. 6C. As shown in FIG. 6C, the task screens 621 through 624 to be switched are based on history information about applications that the device 100 recently used.

Figure 6D:
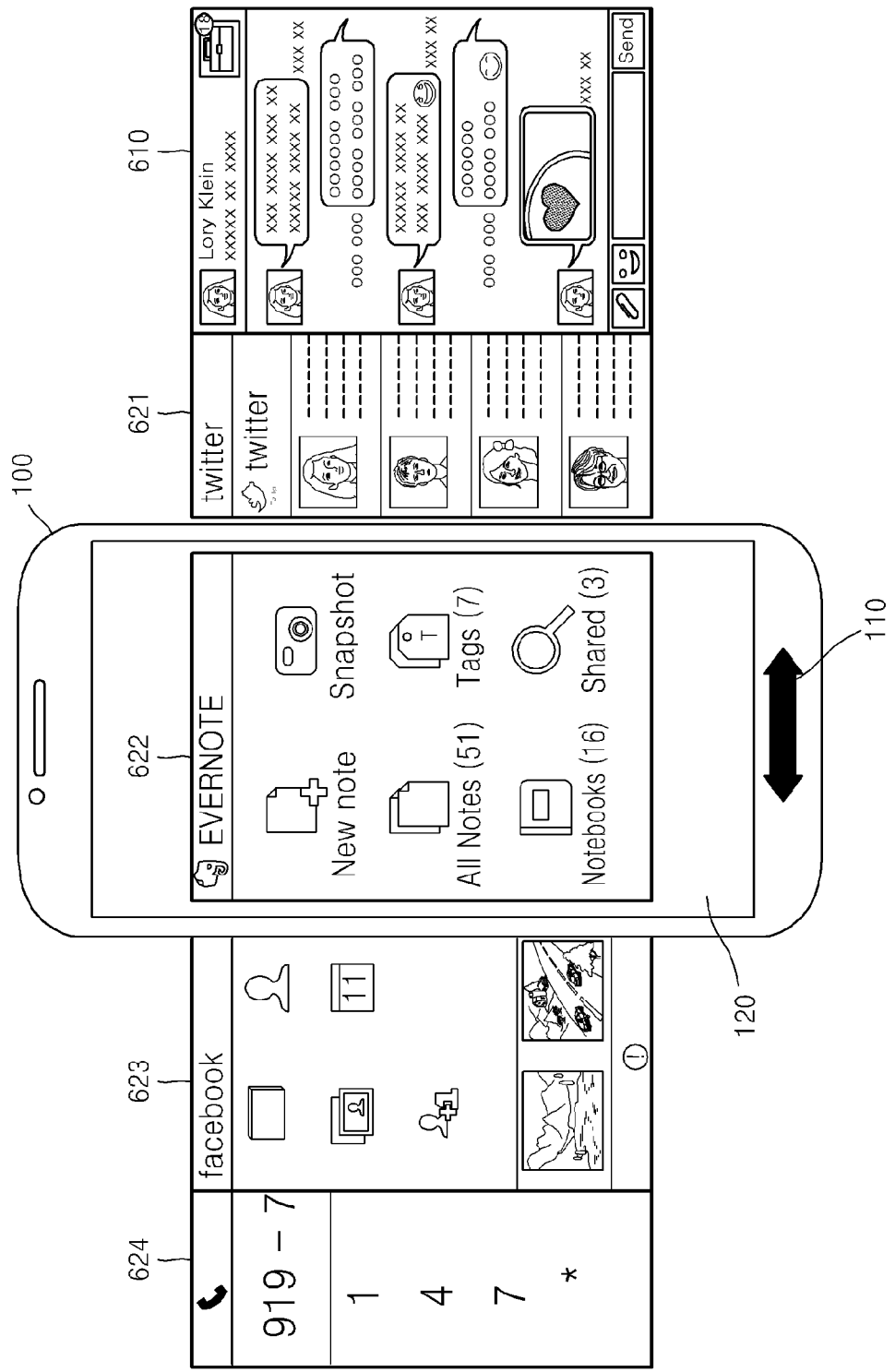

When a second input representing movement in the right direction is received via the button 110, the device 100 performs a task switching for moving, from a left side to a right side, the task screens 621 through 624 arranged based on the current task screen 610, as shown in FIG. 6D. Through the task switching, the task screen which is centered (i.e., prominently displayed, focused, or individually displayed) on the display 120 of the device 100 may be changed.

Figure 7:
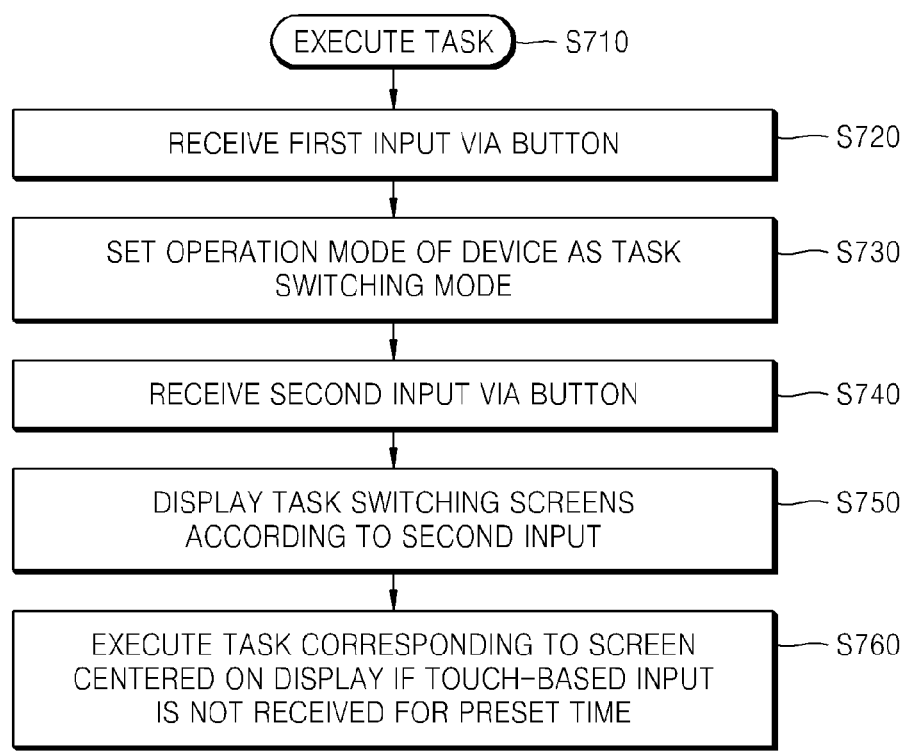
FIG. 7 is a flowchart of a method of switching tasks, the method performed by a device, according to another exemplary embodiment.

FIG. 7 is a flowchart illustrating a task switching method performed by the device 100 according to an exemplary embodiment.

The method of FIG. 7 further includes a process of executing a task corresponding to the switched task screen displayed according to the method of FIG. 4. Therefore, operations S710 through S750 of FIG. 7 correspond to operations S410 through S450, and thus, detailed descriptions thereof are omitted.

In operation S760, if an input is not received via the button 110 for a preset time, the device 100 executes a task corresponding to the task screen centered on the display 120. For example, as shown in FIG. 6D, when a list screen 622 is displayed on the display 120 by the task switching, if a touch-based input is not received for a preset time via the button 120, the device 100 may execute a task corresponding to the list screen 622. Thereafter, the user may select an item included in the list screen 622.

Additionally, if the display 120 is a touch screen, in operation S760, when a touch input representing selection on the task screen centered on the display 120 is received before the preset time has passed, the device 100 may execute a task corresponding to the task screen centered on the display 120.

Figure 8:
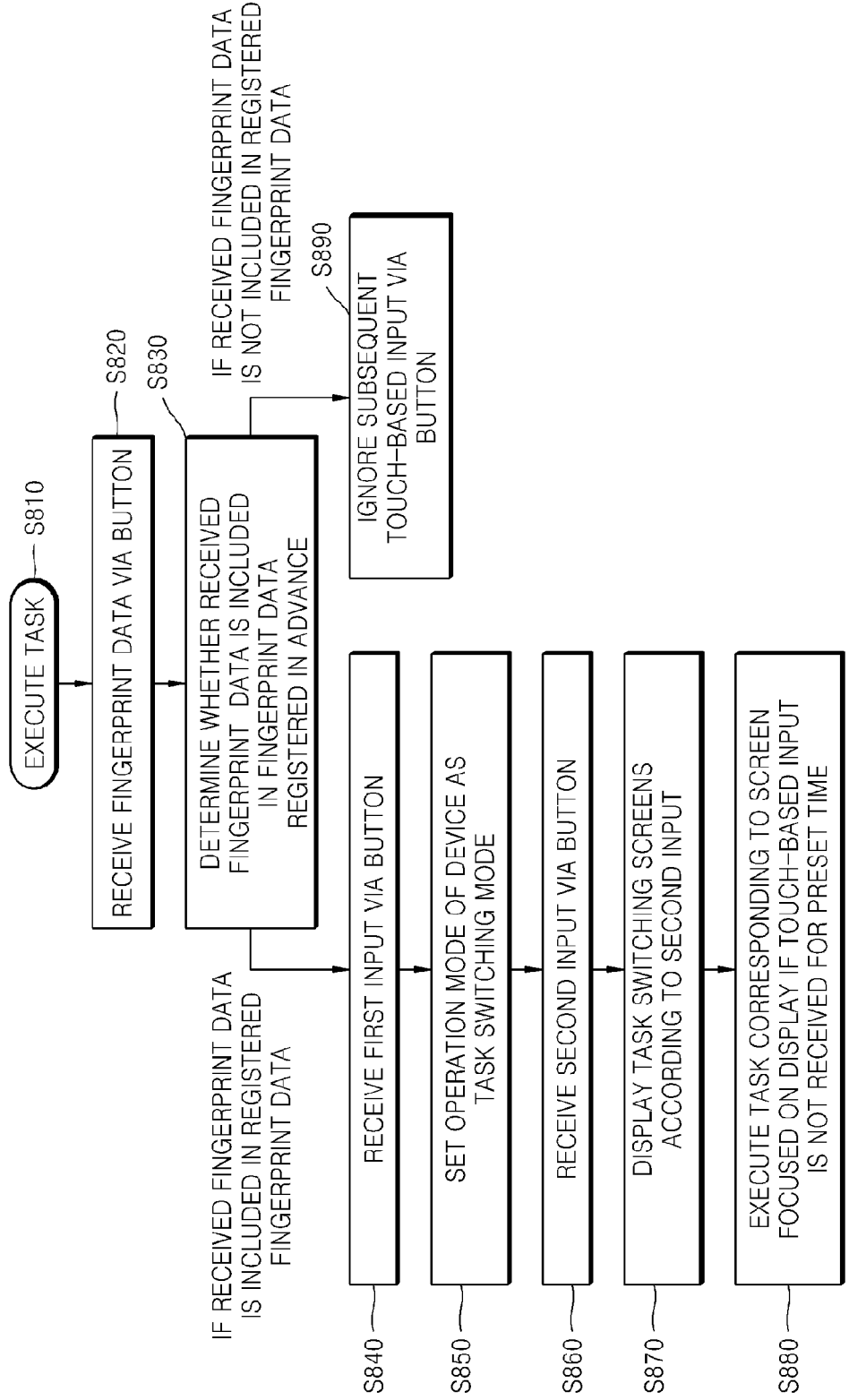
FIG. 8 is a flowchart of a method of switching tasks, the method performed by a device, according to another exemplary embodiment.

FIG. 8 is a flowchart of a task switching method performed by the device 100 according to an exemplary embodiment. FIG. 8 shows an example in which a touch input and a fingerprint data input may be received via the button 110.

During the execution of the task by the device 100, in operation S8210, the device 100 receives fingerprint data via the button 110, in operation S820. The button 110 may be formed as a fingerprint recognition sensor that may capture the fingerprint of a finger when being toughed slightly by the finger.

In operation S830, the device 100 determines whether the received fingerprint data is included in fingerprint data registered in advance. To do this, the device 100 may store fingerprint data that is used for the determination. Accordingly to a result of determination, if the received fingerprint data is included in the fingerprint data registered in advance, the device 100 may execute operations S840 through S880. Operations S840 through S880 are the same as operations S720 through S760 illustrated in FIG. 7, and thus, detailed descriptions thereof are not provided here.

Conversely, if the result of the determination, in operation S830 is that the received fingerprint data is not included in the fingerprint data registered in advance, the device 100 may ignore a subsequent touch-based input via the button 110, in operation S890.

Figure 9:
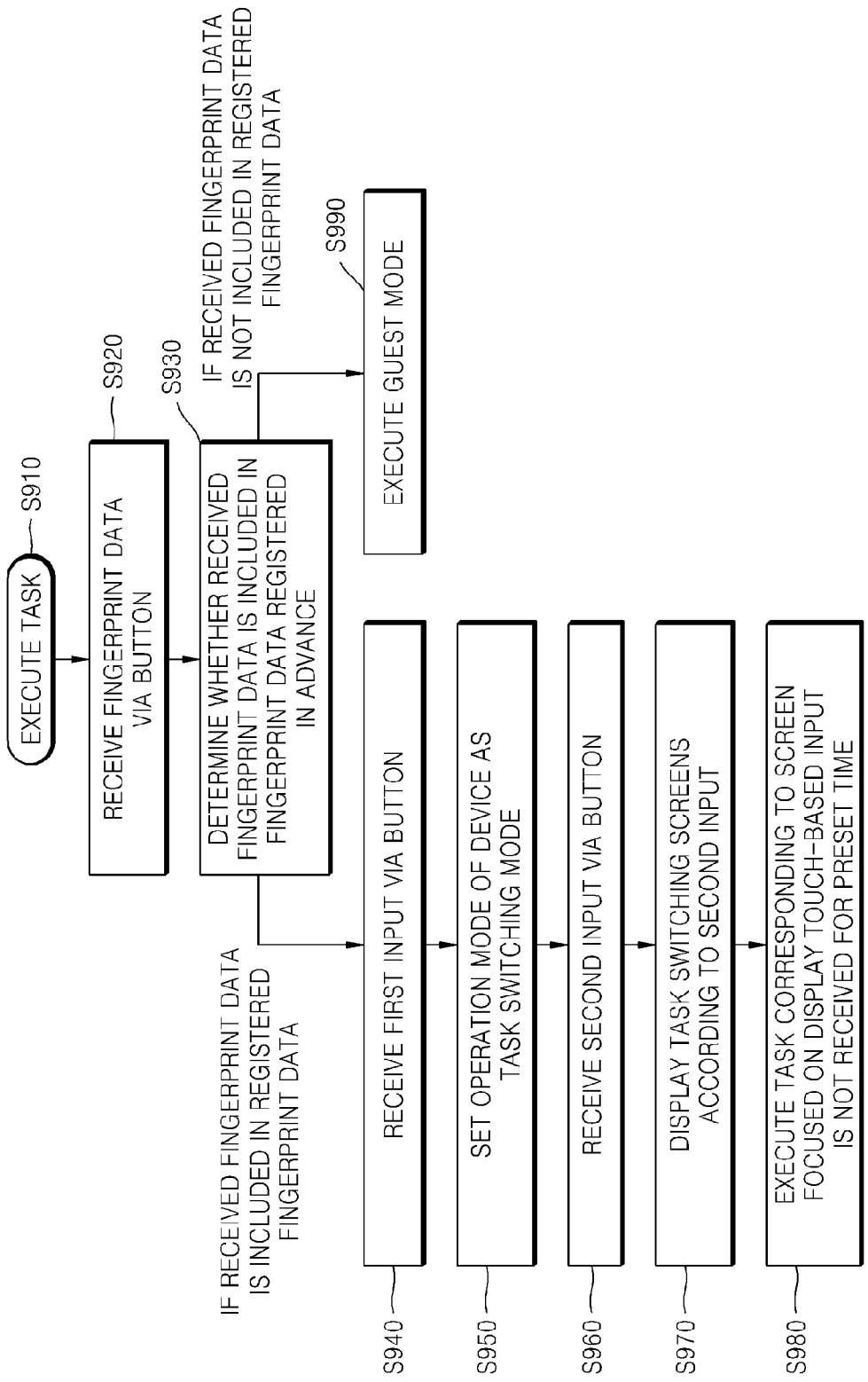
FIG. 9 is a flowchart of a method of switching tasks, the method performed by a device, according to another exemplary embodiment.

FIG. 9 is a flowchart of a task switching method performed by the device 100 according to an exemplary embodiment. FIG. 9 shows an example in which the button 110 may receive a fingerprint data input and a touch input. In FIG. 9, if the fingerprint data received via the button 110 is not included in fingerprint data that is registered in advance, the device 100 operates in a guest mode.

Operations S910 through S980 of FIG. 9 are the same as operations S810 through S880 of FIG. 8, and thus, detailed descriptions thereof are not provided here.

If the fingerprint data received in operation S930 of FIG. 9 is not included in the fingerprint data registered in advance, the device 100 may execute a guest mode, in operation S990. The guest mode is set in advance in the device 100 by the user. A user that is not registered in the device 100 in advance may execute the guest mode of the device 100, and thus, the user may use basic functions provided by the device 100.

Figure 10:
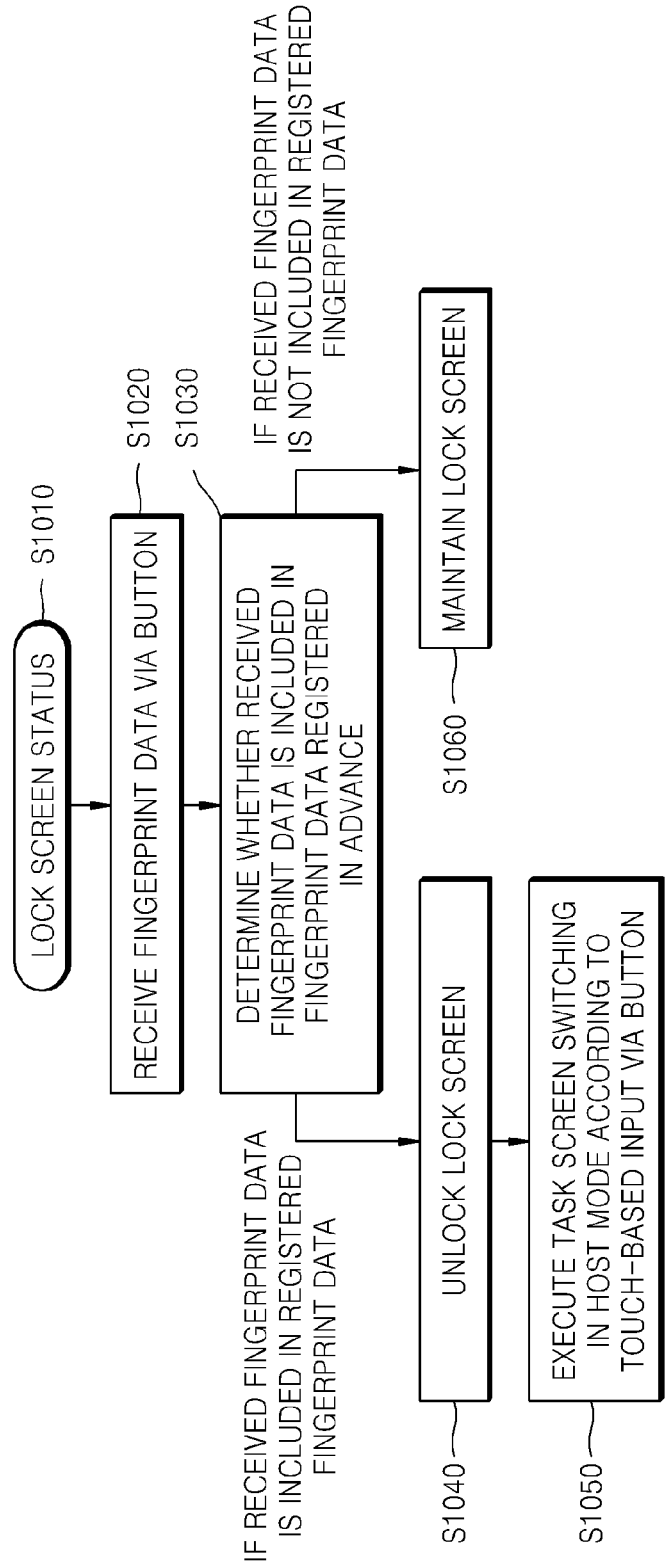
FIG. 10 is a flowchart of a method of switching tasks, the method performed by a device, according to another exemplary embodiment.

FIG. 10 is a flowchart of a task switching method performed by the device 100 according to an exemplary embodiment. FIG. 10 shows a case where an operation status of the device 100 is a lock screen status.

In operation S1010, when the operation status of the device 100 is a lock screen status, the device 100 may receive fingerprint data via the button 110, in operation S1020. Here, the device 100 may display a guide message showing the lock screen status using the fingerprint data on the display 120. However, the message showing the lock screen status using the fingerprint data may not be displayed.

In operation S1030, the device 100 may determine whether the received fingerprint data is included in fingerprint data registered in advance. As a result of determination, if the received fingerprint data is included in the fingerprint data registered in advance, the device 100 unlocks the lock screen, in operation S1040.

In operation S1050, the device 100 may perform a task switching in a host mode according to the touch-based input via the button 110. The touch-based input may include at least one of the first input and the second input.

Conversely, if the result of the determination in operation S1030 is that the received fingerprint data is not included in the fingerprint data registered in advance, the device 100 may maintain the lock screen status, in operation S1060.

Figure 11:
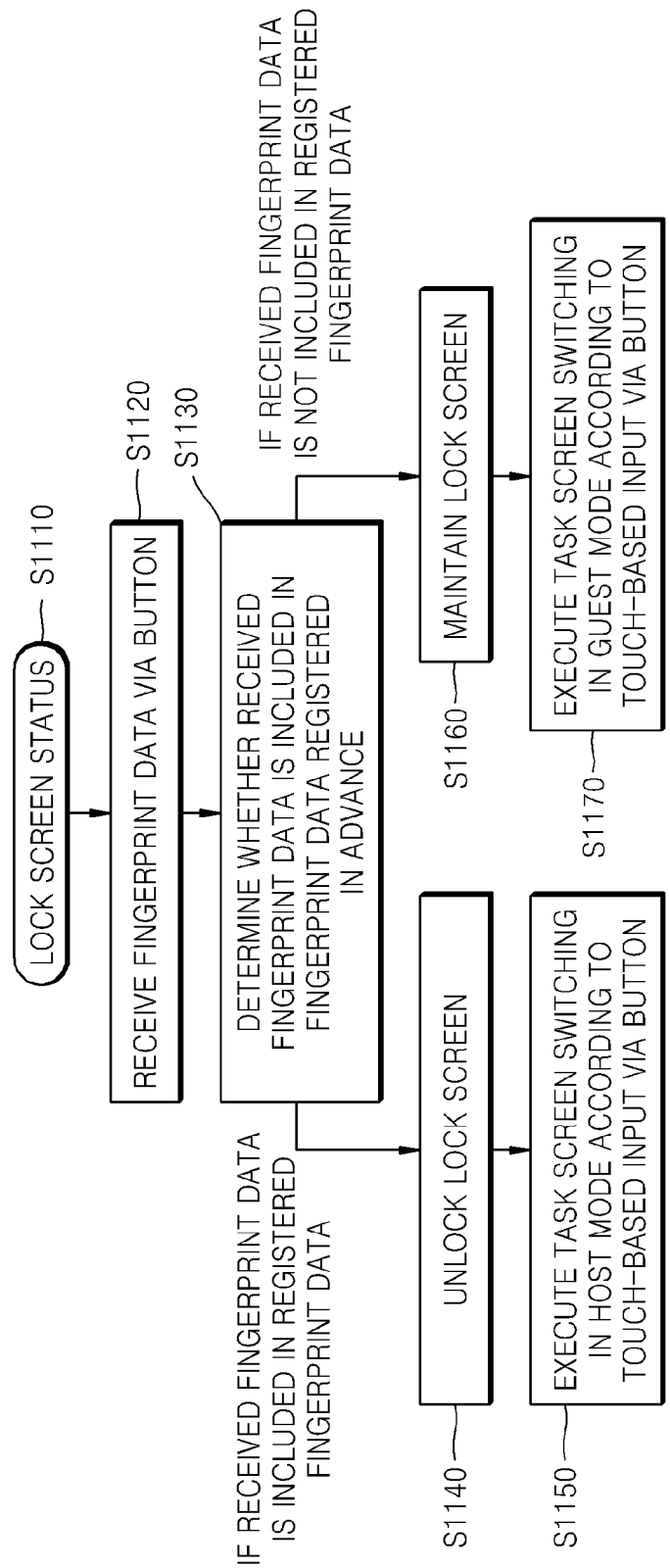
FIG. 11 is a flowchart of a method of switching tasks, the method performed by a device, according to an exemplary embodiment.

FIG. 11 is a flowchart of a task switching method performed by the device 100 according to an exemplary embodiment.

In a status where the operation status of the device 100 is the lock screen status, in operation S1110, the device 100 receives the fingerprint data via the button 110, in operation S1120. If it is determined that the fingerprint data is included in the fingerprint data registered in advance, in operation S1130, the task switching operation based on a task screen is performed in a host mode in operations S1140 and S1150, as described above with reference to FIG. 10.

Otherwise, if it is determined that the fingerprint data received via the button 110 is not included in the fingerprint data registered in advance, in operation S1130, the device 100 unlocks the lock screen, in operation S1160, and executes a task switching operation based on a task screen in a guest mode according to the touch input received via the button 110, in operation S1170.

Figure 12:
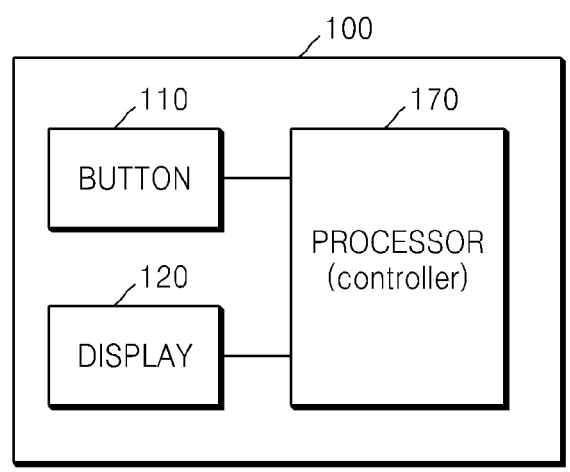
FIGS. 12 and 13 are block diagrams of devices according to exemplary embodiments.
Figure 13:
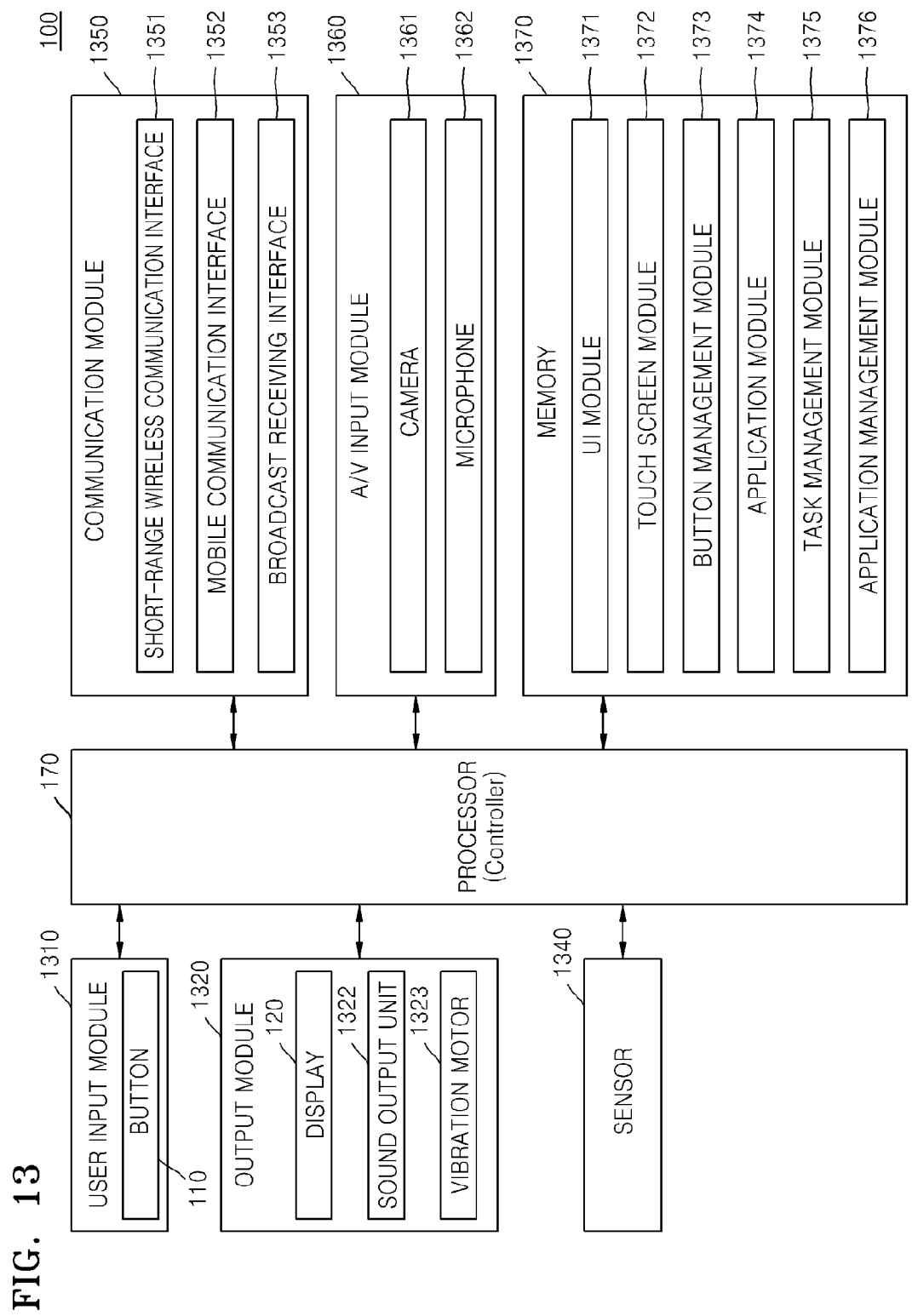

FIGS. 12 and 13 are block diagrams of the device 100 according to exemplary embodiments.

As shown in FIG. 12, the device 100 may include the button 110, the display 120, and a processor 170. However, the components shown in FIG. 12 are merely exemplary and the device 100 may include more or less components than those shown in FIG. 12.

For example, as shown in FIG. 13, the device 100 may include a user input module 1310, an output module 1320, the processor 170, a sensor 1340, a communication module 1350, an audio/video (A/V) input module 1360, and a memory 1370.

Hereinafter, the above components will be described in greater detail below.

The user input module 1310 may be a component by which the user inputs data for controlling the device 100. For example, the user input module 1310 may include a keypad, a dome switch, a jog wheel, or a jog switch; however, one or more exemplary embodiments are not limited thereto. The user input module 1310 may include the button 110. The button 110 may be configured as described in FIG. 1.

The output module 1320 may output at least one of an audio signal, a video signal, and a vibration signal, and may include at least one of a display 120, a sound output device 1322, and a vibration motor 1323.

The display 120 may display information processed by the device 100. For example, the display 1321 may display task switching screens based on a touch input via the button 110.

If the display 120 is configured as a touch screen including touch pads of a layered structure, the display 120 may be used as an input device, as well as an output device. The display 120 may include at least one of a liquid crystal display (LCD), a thin film transistor liquid crystal display (TFT-LCD), an organic light-emitting diode (OLED) display, a flexible display, a three-dimensional (3D) display, and an electrophoretic display. In addition, according to a configuration of the device 100, the device 100 may include two or more displays 120. Here, the two or more displays 120 may be disposed to face each other by using a hinge.

The sound output device 1322 may output audio data received from the communication module 1350 or stored in the memory 1370. Also, the sound output device 1322 may output sound signals that are related to functions performed by the device 100 (for example, a call signal receiving sound, a message receiving sound, and an alarm sound). The sound output device 1322 may be a speaker, a buzzer, etc.

The vibration motor 1323 may output a vibration signal. For example, the vibration motor 1323 may output a vibration signal corresponding to an output of audio data or video data (for example, the call signal receiving sound, the message receiving sound, etc.). Also, the vibration motor 1323 may output a vibration signal when a touch input is sensed by the touch screen. The vibration motor 1323 may output a vibration signal when the device 100 receives a touch input via the button 110.

The processor 170 generally controls overall operations of the device 100. Accordingly, the processor 170 may be referred to as a controller. For example, the processor 170 may execute programs stored in the memory 1370 to control the user input module 1310, the output module 1320, the sensor 1340, the communication module 1350, the A/V input module 1360, and the memory 1370.

The processor 170 may operate based on one of the methods of FIGS. 4, and 7 through 11 according to exemplary embodiments.

The sensor 1340 may sense a status of the device 100 or a peripheral status of the device 100, and may transmit sensing information to the processor 170.

The sensor 1340 may include at least one of a magnetic sensor, an acceleration sensor, a temperature/humidity sensor, an infrared ray sensor, a gyroscope sensor, a location sensor (for example, a global positioning system (GPS)), an atmospheric pressure sensor, a proximity sensor, and a red, green, and blue (RGB) illuminance sensor, but is not limited thereto. Functions of the above-described sensors are known by those of ordinary skill in the art from names thereof, and thus, detailed descriptions thereof are omitted here.

The communication module 1350 may include one or more components by which the device 100 and an external device (not shown) or the device 100 and a server (not shown) communicate with each other. For example, the communication module 1350 may include a short-range wireless communication interface 1351, a mobile communication interface 1352, and a broadcast receiving interface 1353.

The short-range wireless communication interface 1351 may include a Bluetooth communication interface, a Bluetooth low energy (BLE) communication interface, a near field communication (NFC) interface, a wireless local area network (WLAN) communication interface, a ZigBee communication interface, an infrared data association (IrDA)

communication interface, a Wi-Fi direct (WFD) communication interface, an ultra-wideband (UWB) communication interface, or an ANT+ communication interface; however, the communication module 1350 is not limited thereto.

The mobile communication interface 1352 may transmit/receive a wireless signal to/from at least one of a base station, an external terminal, and a server on a mobile communication network. Here, the wireless signal may include various types of data according to a voice call signal, a video call signal, or text/multimedia message transmission.

The broadcast receiving interface 1353 may receive a broadcasting signal and/or information related to broadcasting from the outside via a broadcasting channel. The broadcasting channel may include a satellite channel and a terrestrial broadcasting channel. The device 100 may not include the broadcast receiving interface 1353.

The A/V input module 1360 may input an audio signal or a video signal, and may include at least one of a camera 1361, and a microphone 1362, but is not limited thereto. The camera 1361 may obtain image frames such as still images or moving pictures via an image sensor in a video call mode or an imaging mode or a photographing mode. The image captured by the image sensor may be processed by the processor 170 or an additional image processing unit (not shown).

Image frames processed by the camera 1361 may be stored in the memory 1370 or may be transmitted to the outside via the communication module 1350. Two or more cameras 1361 may be provided according to a configuration of the device 100.

The microphone 1362 may receive an external sound signal and process the sound signal into electronic voice data. For example, the microphone 1362 may receive a sound signal from an external device or a speaker. The microphone 1362 may use various noise reduction algorithms in order to remove noise occurring when receiving the external sound signal.

The memory 1370 may store programs for processing and controlling the processor 170, or may store input/output data (for example, task screens, fingerprint data, and information about task screens corresponding to fingerprint data).

The memory 1370 may include at least one type of storage medium, such as a flash memory type, a hard disk type, a multimedia card micro type, a card type memory (for example, SD, XD memory, etc.), random access memory (RAM), static RAM (SRAM), read only memory (ROM), electronically erasable programmable ROM (EEPROM), programmable ROM (PROM), a magnetic memory, a magnetic disk, and an optical disk. Also, the device 100 may use a web storage or a cloud server performing a storage function of the memory 1370 on the Internet.

The programs stored in the memory 1370 may be classified as a plurality of modules according to functions thereof, for example, a user interface (UI) module 1371, a touch screen module 1372, a button management module 1373, an application module 1374, a task management module 1375, and an application management module 1376.

The UI module 1371 may provide a UI or a graphical UI (GUI) specified with respect to the device 100 for each application. The touch screen module 1372 may sense a touch gesture of the user on the touch screen, and may transmit information about the touch gesture to the processor 170. The touch screen module 1372 may receive a touch input representing a selection on the centered task screen. The touch screen module 1372 may be configured as additional hardware including a controller.

The button management module 1373 may sense a touch or a touch gesture of the user on the button 110, and may transmit information about the touch and the touch gesture to the processor 170. The button management module 1373 may sense fingerprint data based on the touch of the user on the button 110, and may transmit the fingerprint data to the processor 170.

Accordingly, the processor 170 may perform an analysis process on the fingerprint data. The analysis process performed on the fingerprint data may include a process of determining whether the fingerprint data is included in the fingerprint data registered in advance. The process of determining whether the fingerprint data is included in the fingerprint data registered in advance may include a process of comparing the sensed fingerprint data with the fingerprint data registered in advance. To do this, the memory 1370 may further include a fingerprint data management module (not shown).

The application module 1374 may include applications set in the device 100. The task management module 1375 may manage information about a task screen for each of the tasks so as to provide the task screen relating to the task switching operation, may manage the above-described various references (for example, categories, folders, applications, and history information about recently performed tasks), and may manage, as a database, information about the task screens that may be provided according to the second input that may be received via the button 110. The application management module 1376 manages applications included in the application module 1374 in communication with the task management module 1373.

In addition, other exemplary embodiments can also be implemented through computer-readable code/instructions in/on a medium, e.g., a computer-readable medium, to control at least one processing element to implement any above-described exemplary embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs or DVDs), and transmission media such as Internet transmission media. Thus, the medium may be a defined and measurable structure including or carrying a signal or information, such as a device carrying a bitstream according to one or more exemplary embodiments. The media may also be a distributed network, so that the computer-readable code is stored/transferred and executed in a distributed fashion. Furthermore, the processing element could include a processor or a computer processor, and processing elements may be distributed and/or included in a single device.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments. While the forgoing exemplary embodiments have been described with reference to the figures, it will be understood by those of ordinary skill in the art that various changes in form and details may be made therein without departing from the spirit and scope of the inventive concept, as defined by the following claims, and many alternatives, modifications, and variations will be apparent to those skilled in the art.

What is claimed is:

1. A device comprising:
   a button configured to receive an input;
   a display configured to display task switching screens for switching a plurality of task screens that are grouped into a plurality of task screen groups; and
   a processor configured to:
   in response to the button receiving a first input, set a task switching mode; and
   in response to receiving a second input comprising a gesture-based input representing a moving direction of a touch input, switch the task screens according to the moving direction of the second input,
   wherein the processor is configured to determine the moving direction in each of a first direction, a second direction that is perpendicular to the first direction, and
   a third direction that is in a diagonal direction between the first direction and the second direction,
   wherein in response to the moving direction being the first direction, the task screens grouped in a first task screen group among the plurality of task screen groups are switched,
   in response to the moving direction being the second direction, the task screens grouped in a second task screen group among the plurality of task screen groups are switched, and
   in response to the moving direction being the third direction, the task screens grouped in a third task screen group among the plurality of task screen groups are switched,
   wherein the first task screen group, the second task screen group, and the third task screen group are each selected from one group from among a plurality of groups comprising currently executed tasks, recently executed tasks, and favorite tasks.

2. The device of claim 1, wherein the processor is configured to set the task switching mode by:
   capturing a screen of a task that is currently being executed; and
   arranging at least one task screen that is to be provided in response to the second input being received, based on the captured task screen.

3. The device of claim 2, wherein the processor is configured to set the task switching mode by controlling the display to display information representing the second input and information about the at least one task screen that is to be provided in response to the second input being received.

4. The device of claim 1, wherein the button comprises a home button of the device.

5. The device of claim 1, wherein the button is located in a region of the device other than a region of the device where the display is disposed.

6. The device of claim 1, wherein the display comprises a touch screen, and the button is located in a region of the device other than a region of the device where the touch screen is disposed.

7. The device of claim 1, wherein the processor is configured to, if no touch input is received via the button while the task switching screens are displayed on the display, execute a task mapped with a task screen centered on the display.

8. The device of claim 1, wherein the button is configured to receive fingerprint data, and
   wherein the processor is configured to control the display to display the task switching screens in response to the button receiving fingerprint data corresponding to fingerprint data that is registered in advance.

9. The device of claim 1, wherein the button is configured to receive fingerprint data, and
   wherein the processor is configured to control the display to display the task switching screens in response to the button receiving fingerprint data corresponding to fingerprint data registered in advance, and execute a guest mode of the device in response to the received fingerprint data not corresponding to the fingerprint data registered in advance.

10. The device of claim 1, wherein the button is configured to receive fingerprint data, and
    wherein the processor is configured to control the display to display a task switching screen mapped with the fingerprint data in response to the button receiving fingerprint data corresponding to a piece of fingerprint data from among fingerprint data registered in advance, and execute a guest mode of the device in response to the received fingerprint data not corresponding to a piece of fingerprint data from among the fingerprint data registered in advance.

11. The device of claim 1, wherein the button is configured to receive fingerprint data, and
    wherein the processor is configured to ignore a subsequent touch input received by the button in response to the received fingerprint data not corresponding to fingerprint data registered in advance.

12. The device of claim 1, wherein the first input comprises a touch input to maintain a touch operation for at least a preset time.

13. A device comprising:
    a button configured to receive fingerprint data and an input of a first user while an operation status of the device is a lock screen status;
    a display configured to display task switching screens; and
    a processor configured to:
    in response to the received fingerprint data of the first user corresponding to fingerprint data registered in advance:
    unlock the lock screen status,
    receive a first input of the first user via the button,
    set a task switching mode in response to the button receiving the first input of the first user, and control the display to display the task switching screens in response to the button receiving a second input of the first user,
    detect a first finger of the first user or a second finger of the first user via the button,
    in response to the received fingerprint data corresponding to the first finger of the first user, determine that task screens to be switched are the task screens grouped in a first task screen group among a plurality of task screen groups, or
    in response to the received fingerprint data corresponding to the second finger of the first user, determine that task screens to be switched are the task screens grouped in a second task screen group among the plurality of task screen groups; and
    in response to the received fingerprint data not corresponding to the fingerprint data registered in advance, maintaining the lock screen status.

14. The device of claim 13, wherein the processor is configured to detect a third finger of the first user, and in response to the received fingerprint data corresponding to the third finger of the first user, determine that task screens to be switched are the task screens grouped in a third task screen group among the plurality of task screen groups.

15. A task switching method comprising:
receiving, during execution of a task, a first input by a button on a device;
setting, in response to the first input being received, an operation mode of the device as a task switching mode;
receiving a second input by the button;
in response to a second input being received by the button, displaying on a display of the device, task switching screens, wherein the second input comprises a gesture-based input representing a moving direction of a touch input;
determining task screens that are to be switched according to the moving direction of the second input; and
determining the moving direction in each of a first direction, a second direction that is perpendicular to the first direction, and a third direction that is in a diagonal direction between the first direction and the second direction,
wherein in response to the moving direction being the first direction, the task screens grouped in a first task screen group among a plurality of task screen groups are switched,
in response to the moving direction being the second direction, the task screens grouped in a second task screen group among the plurality of task screen groups are switched, and
in response to the moving direction being the third direction, the task screens grouped in a third task screen group among the plurality of task screen groups are switched,
wherein the first task screen group, the second task screen group, and the third task screen group are each selected from one group from among a plurality of groups comprising currently executed tasks, recently executed tasks, and favorite tasks.

16. The task switching method of claim 15, wherein the setting the task switching mode comprises:
capturing a screen of a task that is currently being executed; and
arranging at least one task screen that is to be provided in response to the second input being received, based on the captured task screen.

17. The task switching method of claim 16, wherein the setting of the task switching mode further comprises displaying information representing the second input and information about the at least one task screen that is to be provided in response to the second input being received.

18. The task switching method of claim 15, wherein the button comprises a home button of the device.

19. The task switching method of claim 15, wherein the button is located in a region of the device other than a region of the device where the display is disposed.

20. The task switching method of claim 15, wherein the display is configured as a touch screen, and the button is located in a region of the device other than a region of the device where the touch screen is disposed.

21. The task switching method of claim 15, further comprising executing, while the task switching screens are displayed on the display, a task mapped with a task screen centered on the display if no touch-based input is received by the button.

22. The task switching method of claim 15, wherein the task switching screens comprise at least one of a switching screen to switch between tasks that are being executed by the device, a switching screen to switch between tasks based on usage history information of the device, a switching screen to switch between folders set in the device, and a switching screen to switch between tasks registered in the device in advance,
wherein each of the tasks is based on an application, and
wherein the displaying of the task switching screens comprises determining tasks that are to be switched in response to the second input being received.

23. The task switching method of claim 15, further comprising:
receiving fingerprint data by the button; and
executing the task switching method in response to the received fingerprint data corresponding to fingerprint data registered in advance.

24. The task switching method of claim 15, further comprising:
receiving fingerprint data by the button;
executing the task switching method in response to the received fingerprint data corresponding to fingerprint data registered in advance; and
executing a guest mode of the device in response to the received fingerprint data not corresponding to the fingerprint data registered in advance.

25. The task switching method of claim 15, further comprising:
receiving fingerprint data by the button;
executing the task switching method so as to display a task switching screen mapped with the fingerprint data in response to the received fingerprint data corresponding to a piece of fingerprint data registered in advance; and
executing a guest mode of the device in response to the received fingerprint data not corresponding to a piece of the fingerprint data registered in advance.

26. The task switching method of claim 15, wherein the first input is a touch input which maintains a touch operation for at least a preset time.

27. The task switching method of claim 15, wherein the displaying of the task switching screens comprises displaying task switching screens that vary based on a moving direction represented by the second input.

28. A non-transitory computer-readable recording medium having embodied thereon a program for executing the task switching method of claim 15.

29. A task switching method executed by a device, the task switching method comprising:
receiving fingerprint data of a first user via a button on the device while an operation status of the device is a lock screen status;
in response to the received fingerprint data of the first user corresponding to fingerprint data registered in advance:
unlocking the lock screen status;
receiving a first input of the first user via the button;
setting a task switching mode in response to the first input of the first user being received;
receiving a second input of the first user via the button;
displaying task switching screens on a display of the device in response to the second input being received;
detecting a first finger of the first user or a second finger of the first user via the button,
wherein in response to the received fingerprint data corresponding to the first finger of the first user, determining that tasks that are to be switched are the tasks grouped in a first task group among a plurality of task groups, or
in response to the received fingerprint data corresponding to the second finger of the first user, determining that tasks that are to be switched are the tasks grouped in a second task group among the plurality of task groups; and in response to the received fingerprint data of the first user data not corresponding to the fingerprint data registered in advance, maintaining the lock screen status.

30. A task switching method executed by a device, the task switching method comprising:
receiving fingerprint data of a first user via a button on the device while an operation status of the device is a lock screen status;
unlocking the lock screen status in response to the received fingerprint data of the first user corresponding to fingerprint data registered in advance;
receiving a first input of the first user via the button;
setting a task switching mode in response to the first input of the first user being received;
receiving a second input of the first user via the button;
displaying task switching screens on a display of the device in response to the second input of the first user being received; and
detecting a first finger of the first user or a second finger of the first user via the button,
wherein in response to the received fingerprint data corresponding to the first finger of the first user, determining that tasks that are to be switched are the tasks grouped in a first task group among a plurality of task groups, or
in response to the received fingerprint data corresponding to the second finger of the first user, determining that tasks that are to be switched are the tasks grouped in a second task group among the plurality of task groups.

31. A device comprising:
an input unit configured to receive a user input;
a display configured to display task switching screens; and
a controller configured to control the device to enter a task switching mode in response to a first user input being received by the input, and control the display to display the task switching screens in response to a second user input being received by the input while the device is in the task switching mode,
wherein the second user input comprises a gesture-based input representing a moving direction of a touch input,
wherein the controller is configured to determine task screens that are to be switched according to the moving direction of the second user input,
wherein the controller is configured to determine the moving direction in each of a first direction, a second direction that is perpendicular to the first direction, and a third direction that is in a diagonal direction between the first direction and the second direction, and
wherein in response to the moving direction being a first direction, the task screens grouped in a first task screen group among a plurality of task screen groups are switched,
in response to the moving direction being the second direction, the task screens grouped in a second task screen group among the plurality of task screen groups are switched, and
in response to the moving direction being the third direction, the task screens grouped in a third task screen group among the plurality of task screen groups are switched,
wherein the first task screen group, the second task screen group, and the third task screen group are each selected from one group from among a plurality of groups comprising currently executed tasks, recently executed tasks, and favorite tasks.

32. The device of claim 31, wherein in response to the device entering the task switching mode, the controller is further configured to capture a screen of a currently executed task and arrange the task switching screens based on the currently executed task.

33. The device of claim 32, wherein in response to the device entering the task switching mode, the controller is further configured to display message information,
wherein the message information includes at least one from among a current mode of the device and arrows indicating available scrolling directions of the task switching screens.

34. The device of claim 31, wherein the controller is further configured to arrange the task switching screens in response to user fingerprint data being received by the input.

35. The device of claim 13, wherein the controller is further configured to execute a task corresponding to a task screen of the task switching screens in response to the task screen being selected.

* * * * *